United States Patent
Roberts et al.

(10) Patent No.: US 9,578,289 B2
(45) Date of Patent: Feb. 21, 2017

(54) DYNAMIC MIXED MEDIA PACKAGE

(75) Inventors: Dale T. Roberts, San Anselmo, CA (US); Markus K. Cremer, Berkeley, CA (US); Michael W. Mantle, San Rafael, CA (US); Stephen Helling White, San Francisco, CA (US); Marc Theeuwes, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 1078 days.

(21) Appl. No.: 12/598,381

(22) PCT Filed: May 2, 2008

(86) PCT No.: PCT/US2008/062524
§ 371 (c)(1),
(2), (4) Date: Feb. 9, 2010

(87) PCT Pub. No.: WO2008/137756
PCT Pub. Date: Nov. 13, 2008

(65) Prior Publication Data
US 2010/0185502 A1    Jul. 22, 2010

Related U.S. Application Data

(60) Provisional application No. 11/799,865, filed on May 2, 2007.

(51) Int. Cl.
G06F 21/00        (2013.01)
H04N 7/173        (2011.01)
(Continued)

(52) U.S. Cl.
CPC .......... H04N 7/17318 (2013.01); G06Q 30/02 (2013.01); G06Q 30/0274 (2013.01);
(Continued)

(58) Field of Classification Search
CPC ...................................................... G06F 21/10
(Continued)

(56) References Cited

U.S. PATENT DOCUMENTS 4,030,119 A    6/1977  Ellis
4,677,466 A    6/1987  Lert, Jr. et al.
(Continued)

FOREIGN PATENT DOCUMENTS

DE    4309957         7/1994
EP    0283570 A3      9/1988
(Continued)

OTHER PUBLICATIONS

"U.S. Appl. No. 11/799,865 Restriction Requirement mailed out on Apr. 28, 2010", 7.
(Continued)

*Primary Examiner* — James A Reagan
(74) *Attorney, Agent, or Firm* — Chip Law Group

(57) ABSTRACT

It has been discovered that a dynamic mixed media package with a mechanism for dynamic modification/update provides a media experience to users that exceeds the experience offered by individual media files. A dynamic mixed media package accommodates various types of media and allows for additional media and modifications of existing media. Additional media includes media generated by consumers, such as media derived from a seed media. A seed media is marked and assembled with supplemental media into a package. The seed media is marked to allow performance of various operations, such as identification of the seed media during the lifetime of the package and attribution when the seed media is incorporated into consumer generated derivative media.

21 Claims, 16 Drawing Sheets

(51) Int. Cl.
  *G06Q 30/02*   (2012.01)
  *G06Q 50/18*   (2012.01)
  *G11B 27/034*  (2006.01)
  *H04N 21/235*  (2011.01)
  *H04N 21/236*  (2011.01)
  *H04N 21/431*  (2011.01)
  *H04N 21/433*  (2011.01)
  *H04N 21/434*  (2011.01)
  *H04N 21/435*  (2011.01)
  *H04N 21/4367* (2011.01)
  *H04N 21/472*  (2011.01)
  *H04N 21/475*  (2011.01)
  *H04N 21/8355* (2011.01)
  *H04N 21/8358* (2011.01)
  *H04N 21/8549* (2011.01)
  *G06Q 40/00*   (2012.01)
  *G11B 20/00*   (2006.01)

(52) U.S. Cl.
  CPC ........... *G06Q 40/12* (2013.12); *G06Q 50/182* (2013.01); *G11B 27/034* (2013.01); *H04N 21/235* (2013.01); *H04N 21/23614* (2013.01); *H04N 21/435* (2013.01); *H04N 21/4316* (2013.01); *H04N 21/4334* (2013.01); *H04N 21/4348* (2013.01); *H04N 21/4367* (2013.01); *H04N 21/475* (2013.01); *H04N 21/47202* (2013.01); *H04N 21/8355* (2013.01); *H04N 21/8358* (2013.01); *H04N 21/8549* (2013.01); *G11B 20/00884* (2013.01)

(58) Field of Classification Search
  USPC .......................................................... 705/58
  See application file for complete search history.

(56) References Cited

U.S. PATENT DOCUMENTS

| | | | |
|---|---|---|---|
| 5,019,899 | A | 5/1991 | Boles et al. |
| 5,113,383 | A | 5/1992 | Amemiya et al. |
| 5,276,629 | A | 1/1994 | Reynolds |
| 5,400,261 | A | 3/1995 | Reynolds |
| 5,436,653 | A | 7/1995 | Ellis et al. |
| 5,499,294 | A | 3/1996 | Friedman |
| 5,519,435 | A | 5/1996 | Anderson |
| 5,559,764 | A | 9/1996 | Chen et al. |
| 5,559,949 | A | 9/1996 | Reimber et al. |
| 5,584,025 | A | 12/1996 | Keithley et al. |
| 5,612,729 | A | 3/1997 | Ellis et al. |
| 5,615,345 | A | 3/1997 | Wanger |
| 5,616,876 | A | 4/1997 | Cluts |
| 5,621,454 | A | 4/1997 | Ellis et al. |
| 5,689,484 | A | 11/1997 | Hirasawa |
| 5,691,964 | A | 11/1997 | Niederlein et al. |
| 5,694,546 | A | 12/1997 | Reisman |
| 5,701,385 | A | 12/1997 | Katsuyama et al. |
| 5,703,795 | A | 12/1997 | Mankovitz |
| 5,721,827 | A | 2/1998 | Logan et al. |
| 5,726,957 | A | 3/1998 | Hisamatsu et al. |
| 5,751,672 | A | 5/1998 | Yankowski |
| 5,761,649 | A | 6/1998 | Hill |
| 5,767,893 | A | 6/1998 | Chen et al. |
| 5,768,222 | A | 6/1998 | Hisamatsu et al. |
| 5,774,431 | A | 6/1998 | Bos et al. |
| 5,781,889 | A | 7/1998 | Martin et al. |
| 5,790,793 | A | 8/1998 | Higley |
| 5,796,945 | A | 8/1998 | Tarabella |
| 5,809,250 | A | 9/1998 | Kisor |
| 5,822,436 | A | 10/1998 | Rhoads |
| 5,893,910 | A | 4/1999 | Martineau et al. |
| 5,918,223 | A | 6/1999 | Blum et al. |
| 5,925,843 | A | 7/1999 | Miller et al. |
| 5,959,945 | A | 9/1999 | Kleiman |
| 5,960,081 | A | 9/1999 | Vynne et al. |
| 5,987,525 | A | 11/1999 | Roberts et al. |
| 5,999,637 | A | 12/1999 | Toyoda et al. |
| 6,011,758 | A | 1/2000 | Dockes et al. |
| 6,032,130 | A | 2/2000 | Alloul |
| 6,034,925 | A | 3/2000 | Wehmeyer |
| 6,061,680 | A | 5/2000 | Scherf et al. |
| 6,076,104 | A | 6/2000 | McCue |
| 6,076,111 | A | 6/2000 | Chiu et al. |
| 6,128,625 | A | 10/2000 | Yankowski |
| 6,147,940 | A | 11/2000 | Yankowski |
| 6,195,693 | B1 | 2/2001 | Berry et al. |
| 6,201,176 | B1 | 3/2001 | Yourlo |
| 6,240,459 | B1 | 5/2001 | Roberts et al. |
| 6,243,328 | B1 | 6/2001 | Fenner et al. |
| 6,243,725 | B1 | 6/2001 | Hempleman et al. |
| 6,247,022 | B1 | 6/2001 | Yankowski |
| 6,266,429 | B1 | 7/2001 | Lord et al. |
| 6,272,078 | B2 | 8/2001 | Yankowski |
| 6,345,256 | B1 | 2/2002 | Milsted et al. |
| 6,356,914 | B1 | 3/2002 | de Carmo et al. |
| 6,388,957 | B2 | 5/2002 | Yankowski |
| 6,388,958 | B1 | 5/2002 | Yankowski |
| 6,408,082 | B1 | 6/2002 | Rhoads et al. |
| 6,411,725 | B1 | 6/2002 | Rhoads |
| 6,505,160 | B1 | 1/2003 | Levy et al. |
| 6,633,653 | B1 | 10/2003 | Hobson et al. |
| 6,647,128 | B1 | 11/2003 | Rhoads |
| 6,665,417 | B1 | 12/2003 | Yoshiura et al. |
| 6,674,876 | B1 | 1/2004 | Hannigan et al. |
| 6,700,990 | B1 | 3/2004 | Rhoads |
| 6,737,957 | B1 | 5/2004 | Petrovic et al. |
| 6,748,533 | B1 | 6/2004 | Wu et al. |
| 6,782,116 | B1 | 8/2004 | Zhao et al. |
| 6,829,368 | B2 | 12/2004 | Meyer et al. |
| 6,941,003 | B2 | 9/2005 | Ziesig |
| 6,941,275 | B1 | 9/2005 | Swierczek |
| 6,952,774 | B1 | 10/2005 | Kirovski et al. |
| 6,963,975 | B1 | 11/2005 | Weare |
| 6,970,886 | B1 | 11/2005 | Conwell et al. |
| 6,983,289 | B2 | 1/2006 | Commons et al. |
| 6,990,453 | B2 | 1/2006 | Wang et al. |
| 6,996,775 | B1 | 2/2006 | Dey et al. |
| 7,024,018 | B2 | 4/2006 | Petrovic |
| 7,080,253 | B2 | 7/2006 | Weare |
| 7,082,394 | B2 | 7/2006 | Burges et al. |
| 7,152,021 | B2 | 12/2006 | Alattar et al. |
| 7,159,117 | B2 | 1/2007 | Tanaka |
| 7,188,248 | B2 | 3/2007 | Watson |
| 7,302,574 | B2 | 11/2007 | Conwell et al. |
| 7,349,552 | B2 | 3/2008 | Levy et al. |
| 7,349,555 | B2 | 3/2008 | Rhoads |
| 7,415,129 | B2 | 8/2008 | Rhoads |
| 7,461,136 | B2 | 12/2008 | Rhoads |
| 7,477,739 | B2 | 1/2009 | Haitsma et al. |
| 7,549,052 | B2 | 6/2009 | Haitsma et al. |
| 7,587,602 | B2 | 9/2009 | Rhoads |
| 7,590,259 | B2 | 9/2009 | Levy et al. |
| 2001/0004338 | A1 | 6/2001 | Yankowski |
| 2001/0031066 | A1 | 10/2001 | Meyer et al. |
| 2002/0023020 | A1 | 2/2002 | Kenyon et al. |
| 2002/0033844 | A1 | 3/2002 | Levy et al. |
| 2002/0059208 | A1 | 5/2002 | Abe et al. |
| 2002/0078359 | A1 | 6/2002 | Seok et al. |
| 2002/0116195 | A1 | 8/2002 | Pitman et al. |
| 2002/0120849 | A1 | 8/2002 | McKinley et al. |
| 2002/0178410 | A1 | 11/2002 | Haitsma et al. |
| 2003/0023852 | A1 | 1/2003 | Wold |
| 2003/0028796 | A1 | 2/2003 | Roberts et al. |
| 2003/0033321 | A1 | 2/2003 | Schrempp et al. |
| 2003/0086341 | A1 | 5/2003 | Wells et al. |
| 2003/0115144 | A1* | 6/2003 | Stefik ............... G06F 21/10 705/51 |
| 2003/0135488 | A1 | 7/2003 | Amir et al. |
| 2004/0028281 | A1 | 2/2004 | Cheng et al. |
| 2004/0128512 | A1 | 7/2004 | Sharma et al. |
| 2004/0143349 | A1 | 7/2004 | Roberts et al. |
| 2004/0172411 | A1 | 9/2004 | Herre et al. |
| 2004/0260682 | A1 | 12/2004 | Herley et al. |

(56) References Cited

U.S. PATENT DOCUMENTS

| | | | |
|---|---|---|---|
| 2005/0004941 | A1 | 1/2005 | Kalker et al. |
| 2005/0192958 | A1* | 9/2005 | Widjojo ............... G06Q 10/02 |
| 2006/0041753 | A1 | 2/2006 | Haitsma |
| 2006/0075237 | A1 | 4/2006 | Seo et al. |
| 2006/0095792 | A1* | 5/2006 | Hurtado ............... G06F 21/10 713/189 |
| 2006/0143190 | A1 | 6/2006 | Haitsma et al. |
| 2006/0206563 | A1 | 9/2006 | Van De Sluis |
| 2006/0218126 | A1 | 9/2006 | De Ruijter et al. |
| 2006/0294469 | A1 | 12/2006 | Sareen |
| 2007/0071330 | A1 | 3/2007 | Oostveen et al. |
| 2007/0106405 | A1 | 5/2007 | Cook et al. |
| 2008/0235600 | A1* | 9/2008 | Harper ............... G06F 9/4443 715/748 |
| 2008/0263360 | A1 | 10/2008 | Haitsma |
| 2008/0274687 | A1 | 11/2008 | Roberts et al. |

FOREIGN PATENT DOCUMENTS

| | | |
|---|---|---|
| EP | 0367585 A2 | 5/1990 |
| EP | 0319567 B1 | 2/1993 |
| EP | 0936531 A2 | 8/1999 |
| EP | 1197020 B1 | 11/2007 |
| GB | 2338869 A1 | 12/1999 |
| JP | 63-104099 | 5/1988 |
| JP | 40299399 | 10/1992 |
| JP | 06-225799 | 8/1994 |
| JP | 06315298 | 11/1994 |
| JP | 11-261961 | 9/1999 |
| JP | 2000-285237 | 10/2000 |
| JP | 2000-305578 | 11/2000 |
| JP | 2001101822 A2 | 4/2001 |
| JP | 2001283568 A2 | 10/2001 |
| WO | WO-9120082 A1 | 12/1991 |
| WO | WO-9705616 A1 | 2/1997 |
| WO | WO-9825269 A1 | 6/1998 |
| WO | WO-9935771 A1 | 7/1999 |
| WO | WO-0120483 A2 | 3/2001 |
| WO | WO-0128222 A2 | 4/2001 |
| WO | WO-0211123 A3 | 2/2002 |
| WO | WO-02065782 A1 | 8/2002 |
| WO | WO-03012695 A2 | 2/2003 |
| WO | WO-2004077430 A2 | 2/2004 |
| WO | WO-2006044622 A2 | 4/2006 |
| WO | WO-2007022533 A2 | 2/2007 |
| WO | WO-2008137756 A3 | 12/2009 |

OTHER PUBLICATIONS

"U.S. Appl. No. 09/933,845, Final Office Action mailed Jul. 5, 2006", 14 pgs.
"U.S. Appl. No. 09/933,845, Final Office Action mailed May 12, 2009", 15 pgs.
"U.S. Appl. No. 09/933,845, Final Office Action mailed May 19, 2005", 10 pgs.
"U.S. Appl. No. 09/933,845, Final Office Action mailed Jul. 3, 2007", 15 pgs.
"U.S. Appl. No. 09/933,845, Non Final Office Action mailed Jan. 3, 2006", 9 pgs.
"U.S. Appl. No. 09/933,845, Non Final Office Action mailed Oct. 27, 2004", 7 pgs.
"U.S. Appl. No. 09/933,845, Non Final Office Action Mailed Oct. 6, 2009", 17 pgs.
"U.S. Appl. No. 09/933,845, Non Final Office Action mailed Nov. 30, 2006", 15 pgs.
"U.S. Appl. No. 09/933,845, Non-Final Office Action mailed Feb. 29, 2008", 13 pgs.
"U.S. Appl. No. 09/933,845, Non-Final Office Action mailed Nov. 25, 2008", 13 pgs.
"U.S. Appl. No. 09/933,845, Response filed Feb. 25, 2009 to Non-Final Office Action mailed Nov. 25, 2008", 11 pgs.
"U.S. Appl. No. 09/933,845, Response filed Mar. 28, 2006 to Non-Final Office Action mailed Jan. 3, 2006", 9 pgs.
"U.S. Appl. No. 09/933,845, Response filed Mar. 30, 2007 to Non-Final Office Action mailed Nov. 30, 2006", 8 pgs.
"U.S. Appl. No. 09/933,845, Response filed Apr. 27, 2005 to Non Final Office Action mailed Oct. 27, 2004", 8 pgs.
"U.S. Appl. No. 09/933,845, Response filed Aug. 14, 2008 to Non Final Office Action mailed Feb. 29, 2008", 12 pgs.
"U.S. Appl. No. 09/933,845, Response filed Oct. 5, 2006 to Final Office Action mailed Jul. 5, 2006", 10 pgs.
"U.S. Appl. No. 09/933,845, Response filed Oct. 22, 2007 to Final Office Action mailed Jul. 3, 2007", 13 pgs.
"U.S. Appl. No. 09/933,845, Response filed Sep. 14, 2009 to Final Office Action mailed May 12, 2009", 11 pgs.
"U.S. Appl. No. 09/976,038, Notice of Allowance and Fee(S) Due mailed Jun. 28, 2007", 4 pgs.
"U.S. Appl. No. 10/073,772, Advisory Action mailed Jul. 28, 2006", 3 pgs.
"U.S. Appl. No. 10/073,772, Final Office Action mailed Apr. 6, 2006", 21 pgs.
"U.S. Appl. No. 10/073,772, Non Final Office Action mailed Sep. 19, 2005", 13 pgs.
"U.S. Appl. No. 10/073,772, Non-Final Office Action mailed Jan. 9, 2008", 14 pgs.
"U.S. Appl. No. 10/073,772, Notice of Allowance mailed Feb. 28, 2007", 6 pgs.
"U.S. Appl. No. 10/073,772, Notice of Allowance mailed May 23, 2008", 4 pgs.
"U.S. Appl. No. 10/073,772, Notice of Allowance mailed Sep. 6, 2006", 5 pgs.
"U.S. Appl. No. 10/073,772, Notice of Allowance mailed Nov. 19, 2008", 7 pgs.
"U.S. Appl. No. 10/073,772, Preliminary Amendment filed Feb. 11, 2002", 10 pgs.
"U.S. Appl. No. 10/073,772, Response filed Mar. 17, 2006 to Non Final Office Action mailed Sep. 19, 2005", 12 pgs.
"U.S. Appl. No. 10/073,772, Response filed Jul. 6, 2006 to Final Office Action mailed Apr. 6, 2006", 8 pgs.
"U.S. Appl. No. 10/073,772, Response filed Aug. 7, 2006 to Advisory Action mailed Jul. 28, 2006", 3 pgs.
"U.S. Appl. No. 10/073,772, Supplemental Notice of Allowability mailed Nov. 2, 2006", 4 pgs.
"U.S. Appl. No. 10/073,772,Notice of Allowance mailed Aug. 9, 2007", 4 pgs.
"U.S. Appl. No. 10/503,245, Final Office Action mailed on May 28, 2008", 23 pgs.
"U.S. Appl. No. 10/503,245, Non-Final Office Action mailed Nov. 26, 2007", 10 pgs.
"U.S. Appl. No. 10/503,245, Notice of Allowance mailed Sep. 4, 2008", 16 pgs.
"U.S. Appl. No. 10/503,245, Response filed Feb. 26, 2008 to Non-Final Office Action mailed Nov. 26, 2007", 13 pgs.
"U.S. Appl. No. 10/503,245, Response filed Aug. 28, 2008 to Final Office Action mailed May 28, 2008", 13 pgs.
"U.S. Appl. No. 10/529,360, Final Office Action mailed Apr. 17, 2009", 15 pgs.
"U.S. Appl. No. 10/529,360, Non-Final Office Action mailed Apr. 23, 2008", 10 pgs.
"U.S. Appl. No. 10/529,360, Non-Final Office Action mailed Oct. 16, 2008", 14 pgs.
"U.S. Appl. No. 10/529,360, Response filed Feb. 16, 2009 to Non-Final Office Action mailed Oct. 16, 2008", 9 pgs.
"U.S. Appl. No. 10/529,360, Response filed Sep. 23, 2008 to Non-Final Office Action mailed Apr. 23, 2008", 9 pgs.
"U.S. Appl. No. 10/533,211, Advisory Action mailed Mar. 25, 2008", 3 pgs.
"U.S. Appl. No. 10/533,211, Final Office Action mailed Dec. 5, 2007", 13 pgs.
"U.S. Appl. No. 10/533,211, Final Office Action mailed Dec. 17, 2008", 16 pgs.
"U.S. Appl. No. 10/533,211, Non Final Office Action mailed Jun. 12, 2007", 8 pgs.

(56) References Cited

OTHER PUBLICATIONS

"U.S. Appl. No. 10/533,211, Non Final Office Action mailed Nov. 14, 2006", 9 pgs.
"U.S. Appl. No. 10/533,211, Non-Final Office Action mailed Jul. 29, 2008", 14 pgs.
"U.S. Appl. No. 10/533,211, Response filed Feb. 16, 2009 to Final Office Action mailed Dec. 17, 2008", 11 pgs.
"U.S. Appl. No. 10/533,211, Response filed Mar. 5, 2008 to Final Office Action mailed Dec. 5, 2007", 6 pgs.
"U.S. Appl. No. 10/533,211, Response filed Mar. 14, 2007 to Non-Final Office Action mailed Nov. 14, 2006", 8 pgs.
"U.S. Appl. No. 10/533,211, Response filed May 13, 2008 to Advisory Action mailed Mar. 25, 2008", 13 pgs.
"U.S. Appl. No. 10/533,211, Response filed Oct. 1, 2007 to Non-Final Office Action mailed Jun. 12, 2007", 12 pgs.
"U.S. Appl. No. 10/533,211, Response filed Oct. 29, 2008 to Non-Final Office Action mailed Jul. 29, 2008", 13 pgs.
"U.S. Appl. No. 10/534,323, Final Office Action mailed May 13, 2009", 12 pgs.
"U.S. Appl. No. 10/534,323, Non-Final Office Action mailed Apr. 16, 2008", 7 pgs.
"U.S. Appl. No. 10/534,323, Non-Final Office Action mailed Sep. 21, 2009", 7 Pgs.
"U.S. Appl. No. 10/534,323, Non-Final Office Action mailed Oct. 3, 2007", 8 pgs.
"U.S. Appl. No. 10/534,323, Non-Final Office Action mailed Oct. 31, 2008", 7 pgs.
"U.S. Appl. No. 10/534,323, Response filed Jan. 3, 2008 to Non-Final Office Action mailed Oct. 3, 2007", 9 pgs.
"U.S. Appl. No. 10/534,323, Response filed Jan. 29, 2009 to Non-Final Office Action mailed Oct. 31, 2008", 9 pgs.
"U.S. Appl. No. 10/534,323, Response filed Jul. 13, 2009 to Final Office Action mailed May 13, 2009", 11 pgs.
"U.S. Appl. No. 10/534,323, Response filed Jul. 16, 2008 to Non Final Office Action mailed Apr. 16, 2008", 9 pgs.
"U.S. Appl. No. 10/548,702, Non-Final Office Action mailed Jun. 21, 2007", 18 pgs.
"U.S. Appl. No. 10/548,702, Response filed Aug. 29, 2007 to Non-Final Office Action mailed Jun. 21, 2007", 64 pgs.
"U.S. Appl. No. 11/466,056, Non-Final Office Action mailed Jul. 16, 2009", 30 pgs.
"European Application Serial No. 03737399.0, Office Action mailed Mar. 26, 2007", 10 pgs.
"European Application Serial No. 03809813.3, Office Action mailed Jan. 14, 2009", 8 pgs.
"European Application Serial No. 03737399.0, Summons to Attend Oral Proceedings Received mailed Aug. 7, 2009", 9 pgs.
"European Application Serial No. 01976124.6, Office Action mailed Mar. 16, 2007", 5 pgs.
"Generic coding of moving pictures and associated audio information, part 2", *ISO/IEC*, (1995), 1 pg.
"International Application No. PCT/EP01/09623, International Search Report mailed Jul. 2, 2002", 4 pages.
"International Application Serial No. 01976124.6, Office Action mailed Jan. 2, 2008", 7 pgs.
"International Application Serial No. 03798257.6, Office Action mailed Feb. 7, 2008", 6 pgs.
"International Application Serial No. 1976124.6, Office Action mailed Aug. 4, 2005", 4 pgs.
"International Application Serial No. 2002-565363, Non-Final Office Action mailed Oct. 11, 2007", With English Translation, 22 pgs.
"International Application Serial No. IN/PCT/2002/1689, First Examination Report Jun. 20, 2007", 2 pgs.
"Japanese Application Serial No. 2002-565363, Final Office Action mailed Jul. 14, 2008", 12 pgs.
"Korean Application No. 10-2002-7005203, Office Action mailed May 28, 2008", 8 pgs.
"Korean Application No. 10-2002-7005203, Office Action Mailed Jan. 13, 2009", 6 pages.

"Korean Application No. 10-2002-7013737, Final Office Action mailed Sep. 1, 2008", 5 pgs.
"The MusicBrainz Mailing List Archive for Nov. 2000", [Online]. Retrieved from the Internet: <URL:http://www.musicbrainz.org/pipermail/musicbrainz/2000-November.txt.gz>, 30 pgs.
Broder, A. Z, et al., "Syntactic clustering of the Web", *Computer Networks and ISDN Systems*, 29(8-13), (Sep. 1997), 1157-1166.
Cano, P, et al., "A review of algorithms for audio fingerprinting", *Proceedings of 2002 IEEE Workshop on Multimedia Signal Processing*, Virgin Islands, USA, (2002), 5 pgs.
Chen, Qin-Sheng, et al., "Symmetric Phase-Only Matched Filtering of Fourier-Mellin Transforms for Image Registration and Recognition", *IEEE Transactions on Pattern Analysis and Machine Intelligence*, 16 No. 12, New York, (Dec. 1994), 1156-1168.
Cheung, D., et al., "A content-based search engine on medical images for telemedicine", *Proceedings of the 21st International Computer Software and Applications Conference*, (Aug. 13, 1997), 569-572.
Downie, J. Stephen, "The Exploratory Workshop on Music Information Retrieval", *ACM SIGIR '99*, (Aug. 19, 1999), 1-14.
Fletcher, Peter A, et al., "Direct Embedding and Detection of RST Invariant Watermarks", F.A.P. Petitcolas (Ed.): IH 2002, LNCS 2578 Springer-Verlag Berlin Heidelberg, (2003), 129-144.
Foote, Jonathan T, "Content-Based Retrieval of Music and Audio", *Proc. of the SPIE*, Bellingham, US,, (1997), pp. 138-147.
Haitshma, J., et al., ""Speed-Change Resistant Audio fingerprinting using Auto-correlation"", *Philips Research Laboratories Eindhoven, IEEE*, (2003) , pp. 728-731.
Haitsma, J., et al., "A Highly Robust Audio Fingerprinting System", *ISMIR 2002—3rd International Conference on Music Information Retrieval*, [Online]. Retrieved from the Internet: <URL: http://ismir2002.ismir.net/proceedings/02-fp04-2.pdf>, (Oct. 17, 2002), 1-9.
Haitsma, J. A., et al., "Robust Hashing of Multimedia Content", (Dec. 14, 2000), 10 pgs.
Haitsma, Jaap, "Robust Audio Hashing for Content Identification", *International Workshop on Content-Based Multimedia Indexing (CBMI'01)*, Philips Research, (Sep. 2001), 8 pages.
Hirata, K., et al., "Media-based navigation for hypermedia systems", *Proceedings of the Fifth ACM Conference on Hypertext*, (1993), 159-173.
Ido, S, "Multimedia Research Forefront-5", *Business Communications*. 34,(3), (Mar. 1, 1997), 3 pgs.
Kurth, Frank, et al., "Full-Text Indexing of Very Large Audio Data Bases", *Audio Engineering Society Convention Paper*, 110th Convention, Amsterdam, (May 2001), 1-11.
Lienhart, R., "Automatic text recognition for video indexing" *Proceedings of the Fourth ACM International Conference on Multimedia*, (1997), 11-20.
Lin, Ching-Yung, et al., "Rotation, Scale, and Translation Resilient Watermarking for Images", *IEEE Transactions on Image Processing*, vol. 10, No. 5, (May 2001), 767-782.
Martin, Keith D, et al., "Music Content Analysis through Models of Audition", (1998), 8 pgs.
McNab, Rodger J., et al., "Towards the digital music library: tune retrieval from acoustic input", *Proceedings of the First ACM International Conference on Digital Libraries*, (1996), 11-18.
Neuschmied, Helmut, et al., "Content-based Identification of Audio Titles on the Internet", *Proceedings of the First International Conference on WEB Delivering of Music*, (2001), 5 pages.
Oostveen, J., et al., "Feature Extraction and a Database Strategy for Video Fingerprinting", *Lecture Notes in Computer Science*, 2314, Mar. 11, 2002 , 117-128.
Oostveen, Job, "Visual Hashing of Digital Video: Applications and Techniques", (Dec. 2001), 11 pages.
Pereira, Shelby, "Template Based Recovery of Fourier-Based Watermarks Using Log-Polar and Log-log Maps", *IEEE Int. Conf on Multimedia Computing and Systems*, Florence, Italy, (Jun. 1999), 1-5.
Rajasekaran, P., et al., "Microcomputer Implementable Low Cost Speaker-Independent Word Recognition", *IEEE International Con-*

(56) References Cited

OTHER PUBLICATIONS ference on ICASSP '83. *Acoustics, Speech, and Signal Processing*, Abstract; p. 754, right-hand column, Appendix A, A.1, A.2; figure 1, (Apr. 14-16, 1983), 753-756.

Rhoads, Geoffrey B, et al., "Managing on-line media library through links in media signals", U.S. Appl. No. 60/178,028, filed Jan. 26, 2000.

Roscheisen, M., et al., "Beyond Browsing: Shared Comments, SOAPs, Trails and On-Line Communities", *Computer Networks and ISDN Systems*, 27(6) North Holland Publishing, (Apr. 1995), 739-749.

Schneider, Marc, et al., "A Robust Content Based Digital Signature for Image Authentication", *International Conference on Image Processing, 1996*. Proceedings., vol. 3, 1996, 227-230.

Schneier, Bruce, "Chapter 16, Pseudo random sequence generators", *In Applied Cryptography*, John Wiley & Sons, New York, US, 1996, 372-379.

Subramanya, S R, et al., "Transform-Based Indexing of Audio Data for Multimedia Databases", *1997 IEEE*, (1997), 211-218.

Wells, Maxwell J, et al., "Music Search Methods Based on Human Perception", U.S. Appl. No. 09/556,086, filed Apr. 21, 2000, 50 pgs.

Welsh, Matt, et al., "Querying Large Collections of Music for Similarity", *Technical Report UCB/CSDOO—1096, U.C. Berkeley Computer Science Division*, Research sponsored by Advanced Research Projects Agency under grant DABT63-98-C-0038, and equipment grant from Intel Corp., (Nov. 1999), 13 pages.

Wold, E., "Content-based classification, search, and retrieval of audio", *IEEE MultiMedia*, 3(3), (Fall 1996), 27-36.

Yang, Cheng, "MACS: Music Audio Characteristic Sequence Indexing for Similarity Retrieval", Supported by Leonard J. Shustek Fellowship, Stanford Graduate Fellowship program, and NSF Grant IIS-9811904 New Paltz, New York, (Oct. 2001), 123-126.

U.S. Appl. No. 11/799,865, filed May 2, 2007, Dynamic Mixed Media Package.

Non-Final Office Action cited in U.S. Appl. No. 11/799,865, mailed Nov. 9, 2016, 21 pages.

\* cited by examiner

DYNAMIC MIXED MEDIA PACKAGE

CLAIM OF PRIORITY

This application is a U.S. National Stage filing under 35 U.S.C. 371 from International Patent Application Ser. No. PCT/US2008/062524, filed May 2, 2008, and published on Nov. 13, 2008 as WO 2008/137756 A2, which claims the priority benefit of U.S. patent application Ser. No. 11/799,865, filed May 2, 2007 entitled, "DYNAMIC MIXED MEDIA PACKAGE," which priority is hereby claimed under 35 U.S.C. §120 or 365(c), the entire content of which is incorporated herein by reference.

TECHNICAL FIELD

The present application relates generally to the technical field of media packages; and more specifically to delivery and management of dynamic mixed media packages.

BACKGROUND

The entertainment industry does not exercise complete control over their raw assets delivered through digital distribution channels. Conventional delivery of these raw assets suffers from several limitations, which is perhaps most obvious with conventional distribution of music content. First, conventional digital music delivery over the Internet or other digital distribution channels (e.g., digital radio broadcast, Compact Disc, Audio or Video on Demand services through cable, terrestrial broadcast or via satellite, cellular phone networks, etc.) is limited to delivery of an individual or delivery of multiple individual tracks. This limitation constrains a consumer to single track playback. Second, an individual audio track is separate from other related assets. Third, the format of audio tracks is often proprietary (i.e. non-standard) and only in one format or resolution. These limitations hamper control over their raw assets and the ability of music industry members to innovate with respect to their raw assets. Although described in the context of music content, these same issues plague other digital content spaces (e.g., eBooks, videos, games, image data, etc.).

The conventional delivery model restrains the entertainment industry owners' and creators' ability to innovate. The conventional delivery model relies heavily on an intermediate entity (i.e. content aggregators and distributors, download store front and network operators, content delivery and playback software/device manufacturers etc.). The intermediate entity that delivers content separates the owners and creators of the content from their customers. This separation interferes with the owners' and creators' ability to collect helpful statistical data and interact closer with their end customers. Instead, distributors and software/hardware providers (e.g., Apple iTunes® music service, Real Network Rhapsody® music service, etc.) substantially control the consumer experience of consuming content via the Internet, digital media files, and media streams. Allowing these intermediate entities to possess control over distribution and the consumer interaction hinders progress in product differentiation by members of the entertainment industry. Lastly, the intermediate entities have the best abilities to influence the consumption behavior and experience of consumers since they are the closest to the consumers.

SUMMARY

An innovative experience can be provided with a dynamic mixed media package, as well as instituting a media delivery and management model that leverages networks. An encompassing and comprehensive media experience can be presented to the consumer with a package that renders mixed media (e.g. video, additional audio, interviews, lyrics, image artwork, etc.) related to a seed media (e.g. a recording of a particular song), which may be an individual work or a collection of works. The seed media can be associated with supplemental media as a mixed media package (e.g., a file may have pointers to the seed media and the supplemental media, a file may actually contain the seed media and the supplemental media, etc.). Identifying information is generated and associated with the seed media that allows management and tracking of the seed media. Identifying information may be embedded into the seed media (e.g., watermark), derived from the seed media (e.g., a hash value generated, fingerprint data generated, etc.). Identifying information may also be generated and associated with the supplemental media. In addition, a reference to a package query checkpoint is embedded into the package. Accessing the package query checkpoint (or multiple package query checkpoints), such as an IP address of an online network server, allows dynamic modification/updates to be indicated with the dynamic mixed media package.

With a dynamic mixed media package, a user purchases an experience or level of service instead of an individual media file. In addition, the dynamic mixed media package is a product and service with value beyond the individual media files that can expand during the life span of the dynamic mixed media package through the addition of newly released, updated or altered related rich media content. Examples of such expansion include, but are not limited to, additional video clips, music tracks, streaming audio or video, live concert video, music news, editorial reviews, song lyrics, alternate versions of a track, lyric, image or video, karaoke versions and lyrics synchronization data, photographic or image art data, ring tones, data usable to categorize and navigate content (e.g., genre, tempo, mood, release year, country of origin, etc.), and user generated content (e.g., user created music videos, user comments, user re-edited videos or altered soundtracks for videos, user remixes of audio tracks, etc.). The delivery of additional dynamic media can be done on a promotional basis, tied to commerce or advertising, by contest with consumer participation, etc. The media assets (i.e., seed media and/or supplemental media) may also be upgraded or downgraded in quality of size, supported software codecs and bit rates, rendering limitations (e.g., audio only, audio and image, audio and video), etc., for various reasons, such as to fit a particular playback device.

BRIEF DESCRIPTION OF THE DRAWINGS

Some embodiments are illustrated by way of example and not limitation in the figures of the accompanying drawings in which.

DETAILED DESCRIPTION

The subsequent description includes illustrative systems, methods, techniques, instruction sequences and computing machine program products that embody the present invention. For purposes of explanation, numerous specific details are set forth in the following in order to provide an understanding of various embodiments of the inventive subject matter. It will be evident, however, to one skilled in the art that embodiments of the inventive subject matter may be practiced without these specific details. For instance, examples are described below in the context of being performed on a single machine. Multiple machines, however, may be involved in tracking seed media and collecting package modifications. Furthermore, the term media is used frequently throughout within the context of audio and video. The term media, however, should not be limited to these particular examples of media, and include many other types of media, such as photographic images, art images, literature, streaming media, etc. In general, well-known instruction instances, protocols, structures and techniques have not been shown in detail.

For the purposes of this specification, "processing system" includes a system using one or more processors, microcontrollers and/or digital signal processors having the capability of running a "program", which is a set of executable machine code. Processing systems include communication and electronic devices such as (but not limited to) cell phones, music players, personal data assistants (PDAs), automotive entertainment systems and consumer electronics products designed for use at home. Processing systems also include computers, or "computing devices" of all forms (desktops, laptops, palmtops, etc.). A "program" as used herein, includes user-level applications as well as system-directed applications or daemons.

Figure 1:
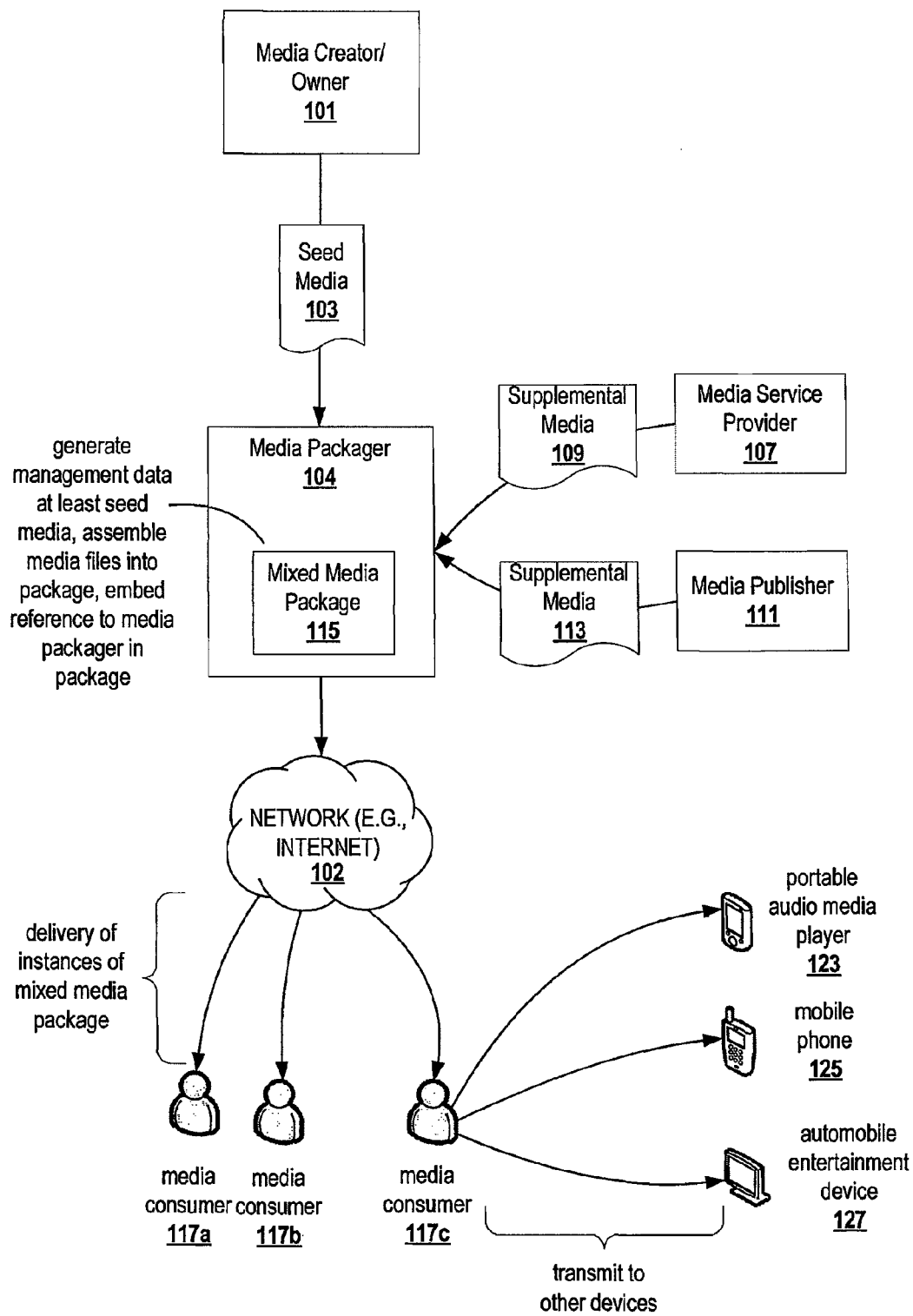
FIG. 1 depicts an example system that bundles media together into a dynamic mixed media package.

FIG. 1 depicts an example system that bundles media together into a dynamic mixed media package. A media owner or creator (e.g., author, recording company, production company, etc.) generates seed media (e.g., video, audio, images, etc.) and transmits the seed media to a media packager 104. The media packager 104 also receives supplemental media 109 and 113 from a media service provider 107 and a media publisher 111, respectively. Supplemental media may be previews, lyrics, trailers, reviews, artwork, etc. For example, media service provider 107 may provide advertisements and the media publisher may provide artwork.

The media packager 104 generates data for management of the seed media. For example, the media packager 104 generates a watermark, fingerprint (e.g., audio fingerprint, video fingerprint, image fingerprint, tandem fingerprint, etc.), and/or hash (e.g., using the MD5 hash function, a SHA hash function, etc.) with the seed media. The media packager, or another entity, can later use the generated management data to perform various management operations with the data, such as track use of the seed media, identify the seed media in a derivative work, etc. Of course, it is not necessary for the media packager to generate the management data. For instance, the media owner/creator may generate the data and communicate the data and/or location of the data to the media packager 104. The media packager 104 may also generate management data with the supplemental media 109 and 113.

The media packager 104 assembles the seed media 103 and the supplemental media 109 and 113 into a mixed media package 115. The media packager 104 writes into the mixed media package 115, perhaps in a header, management data that has not been incorporated into the media and a reference to the media packager 104 as a package query checkpoint. The media packager 104 also writes structural information and directives for presenting the media into the package header and/or section headers. Instances of the mixed media package 115 are then delivered via a network 102 (e.g., LAN, WAN, Internet, cellular networks, etc.) or through comparable distribution processes for non-network connected devices to media consumers 117a-117c, directly or indirectly. For example, the media consumers 117a-117c may have purchased a membership from the media packager 104, purchased an instance of the package 115 from the media packager 104, purchased an instance of the package from another entity that receives the instance of the package 115 from the media packager 104 and forwards the instance of the package 115 to a media consumer, etc.

The media consumers 117a-117c can then transmit or transfer the instance (or a copy of the instance) to another device. In FIG. 1, the media consumer 117c transmits the received instance to a portable audio media player 123, a mobile phone 125, and an automobile entertainment device 127. The transfer of the instance to these devices may involve additional operations. For example, the media consumer 117c may be required to acquire a lower quality version (e.g., more compact, smaller display size, etc.) of certain media in the mixed media package instance for playback on devices with limited resources.

Figure 2:
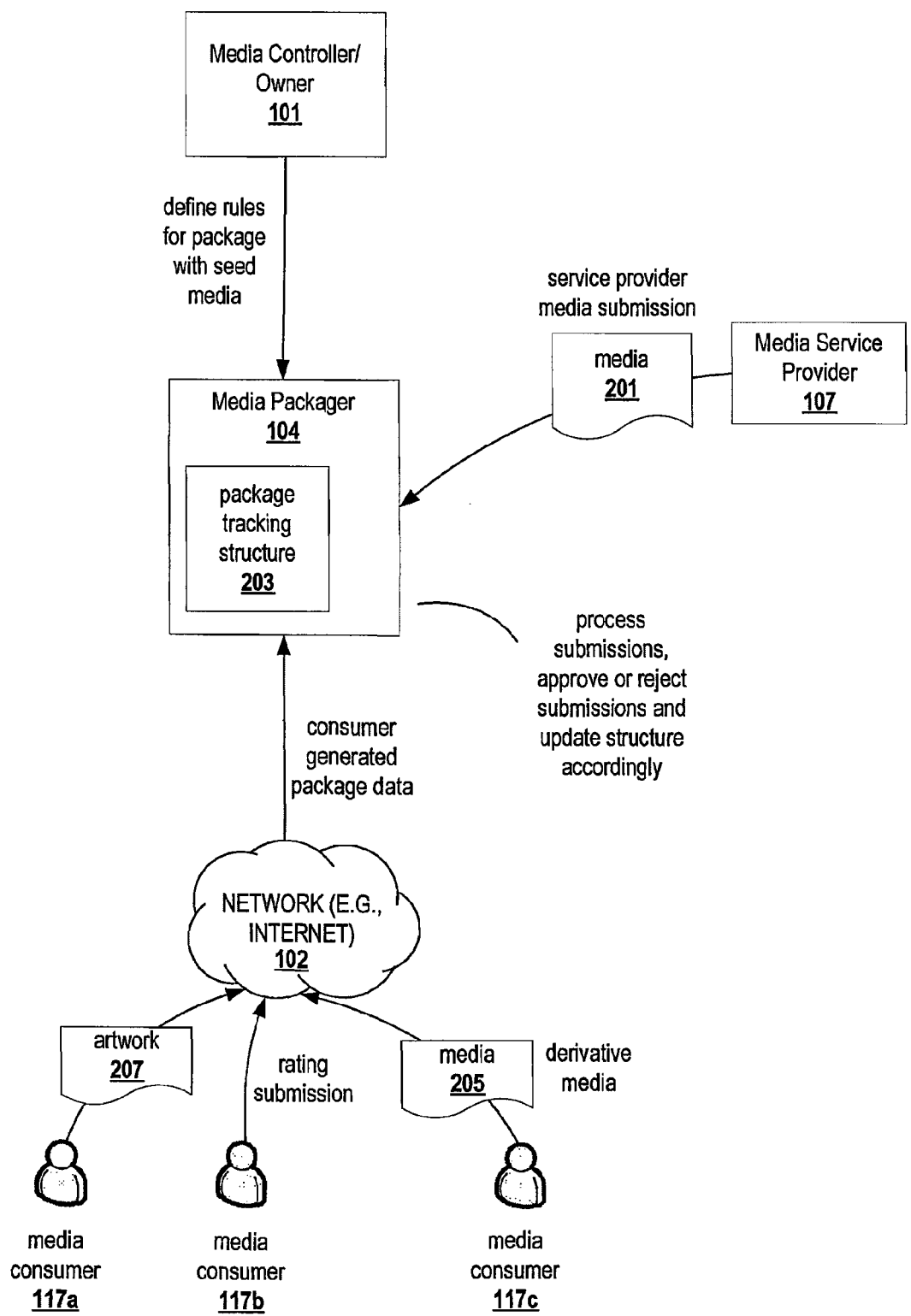
FIG. 2 depicts an example system that propagates package modifications to media consumers.

FIG. 2 depicts an example system that propagates package modifications to media consumers. The media creator/owner 101 delivers rules that govern the mixed media package 115 to the media packager 104. The media packager receives a media submission 201 from the media service provider, such as karaoke style lyrics for seed media that is audio. The media packager 104 also receives consumer generated submissions from the media consumers 117a-117c. The media consumer 117a submits artwork 207. The media consumer 117b submits rating information. The media consumer 117c submits consumer generated derivative media 205. The consumer 117c may choose to only share a portion of her consumer generated derivative media. For example, the consumer 117c may have re-mixed a song and taken digital photos with friends and an artist at a concert. The consumer 117c may choose to keep the photos private, and submit the re-mixed song as the consumer generated media 205.

The consumer 117c may also generate derivative media 205 in the form of replacement or overlaying video or audio. As an example, the consumer 117c may reenact a particular scene out of a movie. In that example, metadata attached with the reenactment may include temporal information which may be used to align the scene with the actual movie so that another consumer 117a-b may choose to view the movie (as a seed media) with the reenacted scene (as derivative media) patched in. Similarly, the consumer 117c may create overlays which may be viewed in conjunction with a video (or audio), and which may also include temporal metadata. Examples of overlay-based media may include images or video to be added to the viewing area of a video, altered soundtrack or voice data, altered channel information or other changes. Altered channel information may include changing, adding to or turning off various channels of video or audio media. For example, with respect to a surround sound video, front and/or rear channels may be altered for relative volume levels, audio may be added or deleted, etc.

The media packager 104 processes the submissions and approves or rejects the submissions in accordance with the rules from the media creator/owner 101. The media packager 104 updates a package tracking structure 203 accordingly to reflect the approval or rejection. Content can also be supplied from the author of the seed media, the owner/creator 101 (assuming the author and owner/creator are not the same), and other service providers. Furthermore, the types of package modifications can include enhancements to the content of a mixed media package, modifications to structural information, modifications to presentation directives, etc.

The rating information submitted by the media consumer 117b and the associated rating process may take a number of forms. The media consumer 117b may view and rate artwork 207, consumer generated media 205, or other provided media (which may include seed media or other supplemental media for example). The rating submission provided by the media consumer 117b may be a scale-based rating (1-5 stars for example), a simple approve/disapprove, yes/no rating, a written review or other rating. According to some example embodiments, the media consumer 117b may submit the rating information using a remote control. According to other example embodiments, the rating information may be submitted using a keyboard and/or other computer interface device. According to some example embodiments, rating information may be provided without the media consumer 117b actively submitting the rating information. As an example, if the media consumer 117b is viewing a video and stops it before a threshold amount or percentage of viewing, a negative rating may be submitted automatically. If the media consumer 117b views the video in its entirety (or at least above a threshold), a positive rating may be submitted. This example may, of course, be applied to any type of media being viewed or experienced by the media consumer 117b. Other rating information may be provided by the media consumer 117b, such as content type/maturity level ratings. For example, content which is delivered without maturity rating information, may be rated by media consumers using suggested maturity rating information.

Rating information may additionally be provided without the media consumer 117b having viewed or experienced the media. In some circumstances, the media consumer 117b may simply read a description pertaining to a media content, and after reading the description the media consumer may provide rating information.

According to some example embodiments, the ratings provided by the media consumer 117b may be used in determining a profile for the media consumer 117b. The profile may be used in selectively delivering additional media content to the media consumer 117b. As an example, if a consumer consistently rates comical or parody videos low, the profile may reflect a distaste for similar videos. Other factors may be used in profiling the media consumer 117b, which will be discussed below.

A dynamic mixed media package allows product flexibility, new sources of revenue, the opportunity for product differentiation, and greater consumer involvement. A dynamic mixed media package can be dynamically modified throughout the life of the package, thus providing the capability to modify the package as well as expand the products/services offered with the package. In addition to adding content from an entity such as a record label, movie studio, or production company, consumers can create derivative media from one or more seed media. The derivative media can be incorporated into the dynamic mixed media package. Consumers can also contribute feedback (e.g., commentary, ratings, etc., as mentioned above) and supplemental media that is not derivative media (e.g., artwork for a seed video or seed audio).

The dynamic mixed media package also allows media owners/creators to collect consumer feedback and nimbly react to the consumer feedback to increase attractiveness of a product or service. A media owner/creator can adjust the contents of a package based on feedback, modify services, etc. A media owner/creator can also identify those consumers that generate the most popular media.

The flexibility and capability for expansion and/or change in the dynamic mixed media package also provides new business models and sources of revenue. Business models may spawn to offer various management services for the dynamic mixed media package, such as statistic collection, tracking and storing of package modifications, etc. The dynamic mixed media package will attract consumers and change consumer behavior with respect to purchasing of media online to create new sources of revenue or increase revenue. Consumers will be motivated to purchase this dynamic mixed media package for the enhanced experience it offers that cannot be achieved with the seed media alone. Consumers can also benefit, reputably or monetarily, when they contribute media that becomes popular. For instance, a consumer generated media associated with a seed media may be associated with an advertisement that generates advertisement revenues for the consumer and/or owner of the seed media. In fact, a consumer may create an advertisement that becomes associated with a seed media in a dynamic mixed media package.

Figure 14:
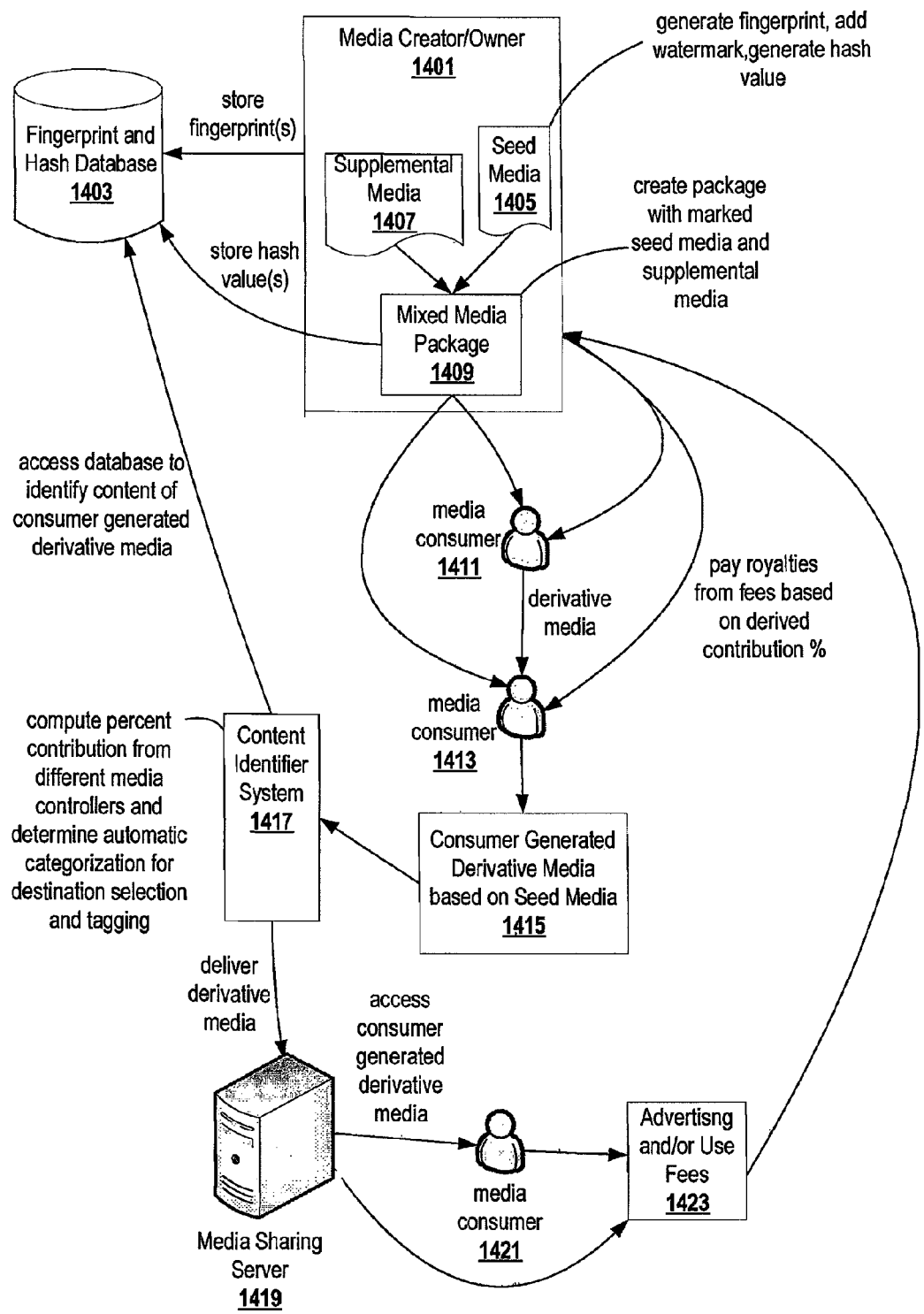
FIG. 14 depicts an example revenue stream from derivative media.

FIG. 14 depicts an example revenue stream from derivative media. A media owner/creator 1401 performs operations to generate a mixed media package 1409. The media owner/creator 1401 generates fingerprint data for the seed media 1405. The media owner/creator 1401 may also generate one or more fingerprints for supplemental media 1407. The media owner/creator 1401 stores the fingerprint(s) in a fingerprint and hash database 1403, which may or may not be controlled by the media owner/creator 1401. The media owner/creator 1401 creates the dynamic mixed media package 1409 with the seed media 1405 and the supplemental media 1407. The media owner/creator 1401 then marks instances of the seed media 1405 with watermarks prior to delivery of the instances to media consumers 1411 and 1413. The instance delivered to the media consumer 1411 includes a watermark in the instance of the seed media 1405 that brands it with an indication of the media consumer 1411 (e.g., a customer account number, a username, etc.). Likewise, the instance delivered to the media consumer 1413 includes a watermark that brands the seed media instance with an indication of the media consumer 1413. The media owner/creator 1401 may also apply a hash function to each of the instances prior to delivery. The media owner/creator 1401 then stores the generated hash values into the fingerprint and hash database 1403. Of course, these operations are not necessarily all performed by the media owner/creator 1401. For instance, the media owner/creator 1401 may only generate the fingerprint(s) and leave it to a media packager to embed watermarks and generate hash values.

Multiple watermarks may be applied to a seed media. A media owner/creator and a media packager (and any other entity in the distribution path of a seed media) may embed one or more different watermarks. There are watermarking techniques that allow tandem watermarking (e.g., embedding multiple watermarks on top of each other). Such tandem watermarking techniques allow for watermarking at multiple stages within the content distribution chain. For example, three different watermarks could be applied to a seed media. A first watermark that contains a generic content identifier (e.g., the ISRC code for a particular recording) can be embedded in a seed media. Then a second watermark that includes a distributor's ID is embedded into the seed media. Finally, a third watermark that includes a customer's ID is embedded into the seed media.

Deployment of a tandem watermarking technique may employ bit stream watermarking algorithms. With these bit stream watermarking algorithms, the watermark is inserted in the encoded/compressed audio or video signal stream, thus avoiding decoding and re-encoding. Although avoiding decoding and re-encoding may be less interesting when the signal is available uncompressed (e.g., at the production stage), it becomes more interesting when the signal is not readily available uncompressed (e.g., at the distribution stage).

The media consumers 1411 and 1413 generate a consumer generated media 1415 based on the seed media 1405 in the mixed media package 1409. The media consumer 1411 first creates a derivative media with the seed media of the mixed media package 1409. For example, the media consumer 1411 creates an audio re-mix with the seed media 1405 and potentially, but not necessarily, with other audio (e.g., consumer created audio, audio from the same artist as the seed media, audio from another artist, etc.). The derivative media is provided to the media consumer 1413. The media consumer 1413 creates a video to accompany the re-mix derivative media to generate the media 1415. For example, the media consumer 1413 creates a video from various animated videos. The media consumers 1411 and 1413 may operate entirely independently, as collaborative partners, as part of a creative community (e.g., an online video sharing community, an online social network community, an online digital image sharing community, etc.), etc. The consumer generated media 1415 is transmitted to a content identifier system 1417, which can entirely or in part reside locally on the consumer's computer or remotely on one or multiple servers.

The content identifier system 1417 processes the media 1415 to determine contribution percentage. The content identifier system 1417 accesses the fingerprint and hash database 1403 to identify content of the consumer generated media 1415. The content identifier system 1417 then computes relative percent contribution from different authors or media owners/creators. The consumer generated media 1415 is then automatically categorized for destination selection and tagged based on the computed percent contribution.

In another embodiment, author attribution is determined based on identifiers, such as watermarks, previously embedded in the media. Using the example illustrated in FIG. 14, the content identifier system 1417 examines the media 1415 to compute relative contribution by authors, whether consumer authors or seed media authors, using techniques such as watermarking. Although the author attribution computation is performed by the content identifier system 1417, a separate system is not necessary for such functionality. Content identification functionality may be implemented with a program proximate to the consumer (e.g., a module or process that works in the background or foreground of the application used by the consumer to mix media, and perhaps generates a watermark to identify media originally created by the consumer), or another third party (e.g., in the media sharing server 1419).

The media 1415 is then provided to a media sharing server 1419, which results in a revenue stream. A media consumer 1421 accesses the consumer generated media 1415. Access of the media 1415 by the consumer 1421 can be considered a revenue generating event. For example, advertisers pay advertising fees for advertising on the web page that presents the media 1415. As the media 1415 increases in popularity, greater advertising fees are generated, assuming the greater exposure leads to more clicks on the advertising links. In another example, consumers pay fees for accessing media hosted by a network including the media sharing server 1419. A portion of these fees are paid to owners/creators of media presented from the network as royalties. Advertising and/or use fees 1423 are paid to the media owner/creator 1401. The media owner/creator 1401 may then pay royalties to the media consumers 1411 and 1413 based on percentage of contribution from the media consumers 1411 and 1413. Such payments to consumers may spur creativity and increase consumer involvement. If the media 1415 includes seed media from another media owner/creator, then the owner of the media sharing server may apportion the payout of fees in accordance with the determined percent contribution. Furthermore, funds may be held in escrow for media contributed by unknown authors. These funds held in escrow may be held indefinitely until the authors are discovered, may be held for a limited period of time and then donated to an artist community, etc.

An entity may also assume accounting responsibilities and act as a clearinghouse for all fees received from media sharing sites and dispense royalties according to the percent contribution to the media owners/creators. For instance, the media packager 104 of FIG. 1 may charge fees to multiple media owners/creators that send their seed media to the media packager 104 for assembly into a dynamic mixed media package. The media packager 104 may charge fees to media consumers for membership in the dynamic mixed media package service. A service may maintain package modifications and propagate the modifications to members, maintain a community of independent artists that generate media (e.g., supplemental media, derivative media, etc.) and provide exposure to the media owner/creators (e.g., producers, publishing companies, other artists, etc.). The media packager 104 may take a percentage of each package purchased by a media consumer. The revenue to the media packager may be flat fee based, variable based, or a hybrid of flat fee and variable fee. Variation in fees may be tied into the number of submissions from consumers, media consumer community activity related to a seed media, etc.

Figure 3:
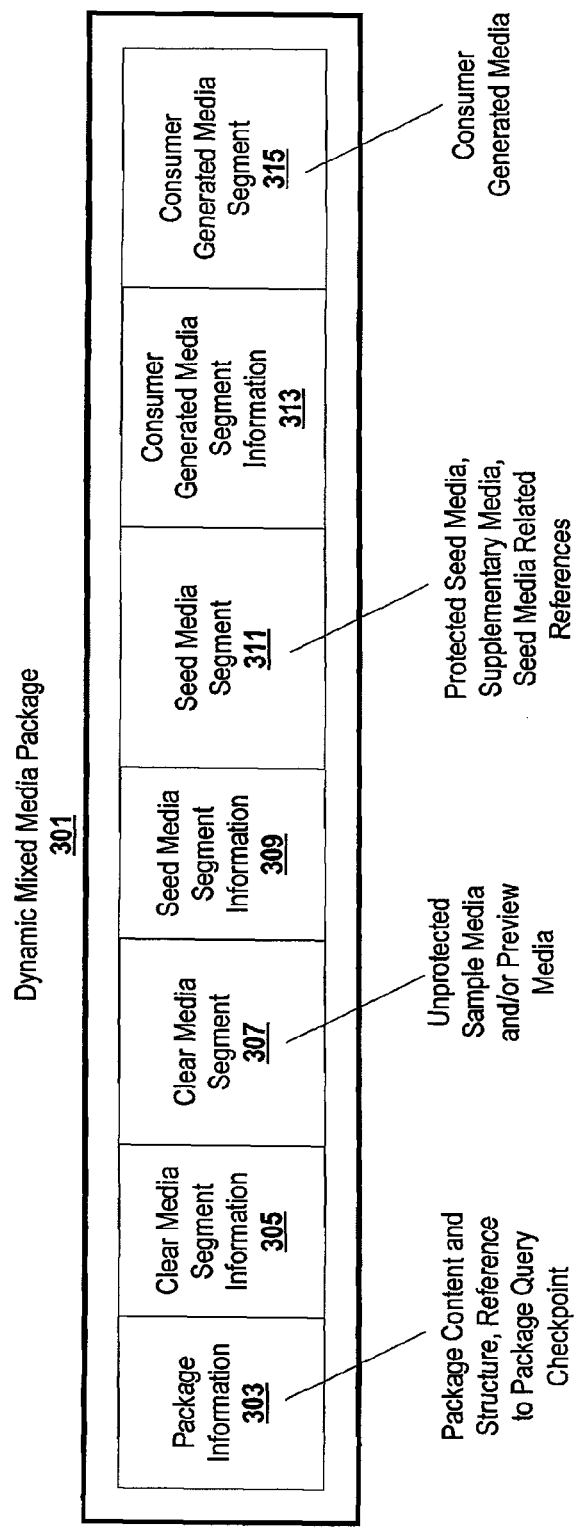
FIG. 3 depicts an example of a general structure of a dynamic mixed media package.

Whatever entity maintains the dynamic mixed media package, the package is created to be flexible to accommodate the management and modification operations discussed above. FIG. 3 depicts an example of a general structure of a dynamic mixed media package. A dynamic mixed media package 301 includes several sections. A first section, which may be referred to as a package header, is a package information section 303. The package information section 303 includes package content and structure information and a reference (e.g., uniform resource locator, internet protocol address, etc.) to a package query checkpoint. The package query checkpoint is a checkpoint location to start querying for package modifications. The package information section 303 may also include one or more references to approved service providers that provide package modifications. The package information section 303 may also include access and authentication information and/or code, directives that govern presentation of content from different sections of the mixed media package 301, service level information, package level information, membership information, etc.

The mixed media package can be implemented as one or multiple instances (containing different media related to a particular seed media). A mixed media package may also be implemented as a virtual package. For instance, a link between various media might just consist in one identifier. This identifier can be absolute (e.g., a unique number or a set of numbers, a fingerprint, or a text string, or a combination thereof that is shared across multiple entities and acts as binding element). This identifier can also be recursive. For instance, one media package contains an index that points to a second package, which in turn contains a different index that references a third media package, etc.

The mixed media package 301 also includes a clear media segment information section 305 and a clear media segment 307. A mixed media package does not necessarily include sections for clear media, but clear media sections can accommodate promotional content (e.g., samples, trailers, previews, reviews, etc.), revenue generating content (e.g., advertisements), etc. The clear media segment section 305 includes information about content and structure of the clear media segment 307, and, perhaps, presentation directives. For example, the clear media segment 307 may include various type of content. Presentation directives in the clear media segment information section 305 may restrict presentation of advertisements to every fifth access of the mixed media package, rotate promotional material, present content each time a new host device is encountered, etc. The clear media segment 307 includes unprotected and/or unrestricted media, such as promotional content as already mentioned. Although not protected and/or restricted, the content in the clear media segment 307 may be marked (e.g., with a watermark) or fingerprinted for management purposes, such as collecting statistics.

The dynamic mixed media package 301 includes a seed media segment information section 309 and a seed media segment 311. The content of the seed media segment 311 is protected and/or restricted. The protection mechanism (e.g., digital rights management mechanism) may be implemented completely or partially in the seed media segment information section 309. The seed media segment information section 309 also includes content and structural information about the seed media segment 311. The seed media segment 311 includes seed media, supplemental media, references related to the seed media (e.g., links to review of the seed media, links to an author website, code that loads a page from the author website, pointers to content at a remote or local location different than the dynamic mixed media package, etc.). For example, the seed media segment 311 may include a reference to access streaming media in a different folder, at a remote server, on a network attached storage device, etc. The streaming media may be played immediately, played when accessed, cached for offline playing, etc. The content of the seed media segment 311 may be videos, audio tracks, an audio collection, images, animations, text, games, podcasts, etc. The seed media segment information section 309 may also include code for collecting statistics about the seed media and/or statistics collected about the supplemental media.

The third portion of the dynamic mixed media package 301 includes a consumer generated media segment information section 313 and a consumer generated media segment 315. The consumer generated media segment 315 may include derivative media created by consumers, independent media created by consumers that relate to the seed media, consumer comments about the seed media, references to consumer websites related to the seed media, code that accesses content from other consumer websites related to the seed media, pointers to content at a remote or local location different than the dynamic mixed media package, etc. The consumer generated media segment information section 313 includes content and structural information about the content of the consumer generated media segment 315. The consumer generated media segment information section 313 may identify individual media in the segment 315, indicate percent contribution for a particular media in the segment 315, indicate popularity of media in the segment 315, etc. The media that may be generated by consumers and added to a package covers a wide gamut of media, such as games, videos, audio, animation, lyrics, poems, commentary, remixes, alternative lyrics, photos, etc. A consumer will have the option to share their personal media with other media package owners (linked to the same seed media) or to keep their personal media for private consumption only.

Those of ordinary skill in the art should appreciate that the example dynamic mixed media package depicted in FIG. 3 is illustrative and not intended to be limiting upon embodiments. For instance, the package is described as including seed media and supplemental media. An implementation of a dynamic mixed media package does not necessarily literally "include" media. The package may include pointers to content, and the content may be in different locations. There are multiple types of file containers already defined that provide guidelines for implementing pointers to contents in different locations (e.g., MPEG-4 Systems (ISO/IEC 14496-1), MPEG-7 (ISO/IEC 15938), MPEG-21 (ISO/IEC 21000), mxf (Material eXchange Format), and aaf (Advanced Authoring Format)).

Figure 15:
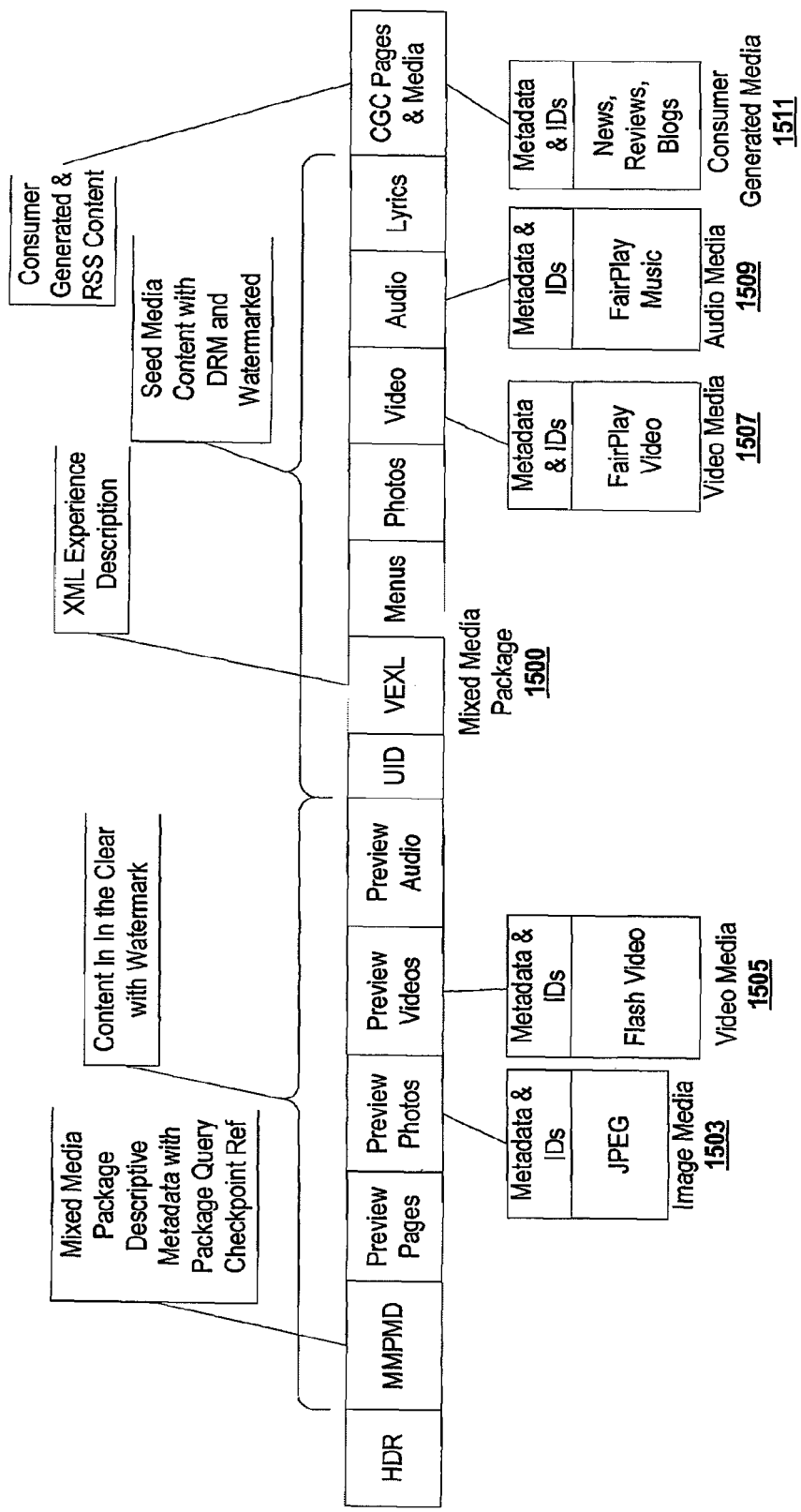
FIG. 15 depicts an example format of a dynamic mixed media package in accordance with the Multimedia Content Description Interface ("the MPEG 7 standard").

The dynamic mixed media package can be implemented in accordance with any of a number of techniques, both standard and proprietary. Although a standard implementation, such as in accordance with an MPEG standard, seems more desirable for wide-spread adoption in the market, a proprietary format may be optimal and/or preferable for other purposes. As a matter of fact, multiple physical formats can conceivably coexist, where conversion prescriptions will allow transitions from one format to another. For instance, a particular format might be suitable for the media exchange across PC platforms, where a significant amount of computational power is available for processing. This format might not be suitable in a more restrained platform environment where the necessity for compact and energy preserving devices might demand a more limited format. FIG. 15 depicts an example format of a dynamic mixed media package in accordance with the Multimedia Content Description Interface standard ("the MPEG-7 standard"). In FIG. 15, a dynamic mixed media package 1500 includes a package header, clear content header, clear content section, seed media header, seed media section, and consumer generated content section. The header may indicate general information about the package, such as creation time, size, access, privileges, etc. The clear content header includes descriptive metadata for the mixed media package 1500. The clear content header also includes a package query checkpoint reference. The clear content section includes preview pages, preview photos, and preview audio. The preview photos include image media 1503 with images compressed in accordance with JPEG and corresponding metadata and identifying data. The preview videos include video media 1505 with flash video and corresponding metadata and identifying data. The seed media header includes an XML experience description. The seed media section includes menus, photos, video, audio, and lyrics that are watermarked and with a digital rights management (DRM) technology applied. The video in the seed media section includes video media 1507 encoded according to FairPlay® DRM technology with corresponding metadata and identifying data. Similarly, the audio in the seed media section includes FairPlay encoded audio media 1509 with metadata and identifying data. The consumer generated section includes consumer generated content and syndicated content via an RSS feed. The consumer generated section includes consumer generated media 1511, examples of which include news, reviews, media from blogs, and feeds from external internet feeds.

Preview and seed media of a mixed media package may be implemented as a single media and not necessarily as separate media. The previews associated with a seed media can be implemented using scalable coding techniques, such as those defined in the MPEG-2 and MPEG-4 standards. The media content is coded in multiple layers, where each layer adds perceptual quality to the decoded/reconstructed signal. It is thus possible to decode only the basic layer of an audio signal and obtain AM quality monaural audio. Decoding the second layer will yield high quality audio with some (inaudible) artifacts, while decoding a third layer will allow the perfect (lossless) reconstruction of the original studio recording itself. This allows the encryption/protection of only a part of the content bit stream, while the first layer will be made available unencrypted as a pre-listening sample.

A similar approach can be taken with spatial information for audio. While the stereo signal might be made available unprotected for public consumption, multi-channel rendering information might be available in a protected format that can be unlocked upon acquisition of the necessary rights.

Though it is technically simpler to keep these different layers of content data in one bit stream format for synchronization upon reconstruction, for distribution purposes, it might be desirable to keep them in separate packages (i.e., the multi-channel information might only be available at a later point in time, after the release of the original media item).

The particular technique used to create a dynamic mixed media package will vary with the type of digital rights management utilized, the desired degree of flexibility for the package, etc. Regardless the specific details of encoding, protection, metadata, etc., the dynamic mixed media package begins with seed media. According to various example embodiments, the dynamic mixed media package may be delivered as a single bundle that may decompress into a file structure on a consumer device. According to some example embodiments, the dynamic mixed media package may create folder structures to store varying types of media. The folder structures may be continuously populated with updated material related to the seed media. A directory file associated with the seed media may detail the various supplemental and derivative media related to the seed media. The supplemental and derivative media may be stored with the rest of the dynamic media package within the local file structure of the consumer, or a pointer may be used to direct the consumer to an external location to retrieve or experience the supplemental or derivative media. The pointer may be a file external to the directory file or may within the directory file. In some embodiments, the directory file is XML based.

Figure 4:
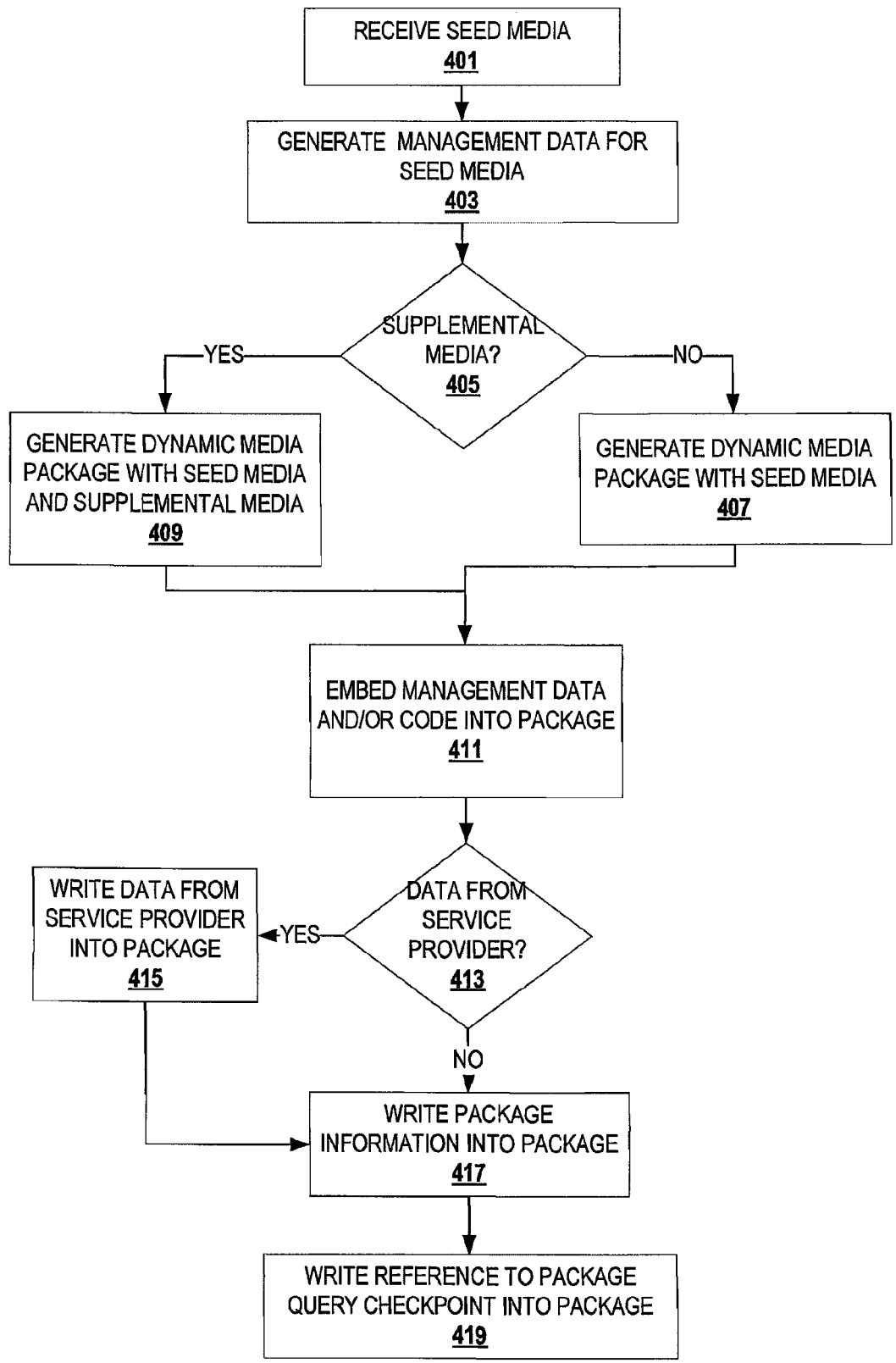
FIG. 4 depicts a flowchart of example operations for creating a dynamic mixed media package.

FIG. 4 depicts a flowchart of example operations for creating a dynamic mixed media package. At block 401, seed media is received, which may be one or more files. Of course, if the media owner/creator is creating the dynamic mixed media package, then block 401 can be skipped. At block 403, management data is generated for the seed media. Management of the seed media may utilize layering of multiple types of data. For example, fingerprinting data and a hash value are generated for the seed media. In addition, the seed media is marked with digital watermarking data. The hash value can be used to quickly identify the media. The fingerprinting data can be utilized to identify a portion or all of the media when combined with other media. The watermarking can be used to track the media and filter user generated media. Although the hash value provides expediency, this operation may be skipped. Furthermore, the fingerprinting may be done at a later time. Also, multiple fingerprinting algorithms can be deployed that each fulfill different robustness and fingerprint data size requirements. For example, one fingerprint format might be highly robust against even drastic changes in the signal (e.g., equalization, pitch shifting, time stretching, dynamic compression, perceptual coding), while another format will be significantly more compact (e.g., the amount of fingerprint data extracted for a certain duration of audio or video content is smaller). A more compact format may be more suitable for transmission through channels with bandwidth limitations. At block 405, it is determined whether there is supplemental media. If there is no supplemental media, then control flows to block 407. If there is supplemental media, then control flows to block 409.

At block 407, a dynamic mixed media package is generated with the seed media. Control flows to block 411 from block 407.

At block 409, a dynamic mixed media package is generated with the seed media and the supplemental media. At block 411, management data and/or management code (e.g., statistic collection code) is embedded into the generated package. At block 413, it is determined whether data from a service provider is available. If a service provider has provided data (e.g., supplemental media, reviews, advertisements, etc.), then control flows to block 415. If not, then control flows to block 417.

At block 415, the data from the service provider is written into the package. At block 417, information about the package is written into the package. For example, structural and content information is written into the package header, clear content header, and/or seed media header. At block 419, a reference to a package query checkpoint is written into the package, as well as any references to service providers that provide package modifications, if any.

After creation of a dynamic mixed media package and delivery of an instance of the dynamic mixed media package, the package can be modified. Modifications to the package can include various media generated by any one of owners, authors, controllers, consumers, and service providers. A modification to a package may be an upgrade, or even a downgrade, in quality of certain package content. For example, video may be enhanced (or higher quality video added to the package) for presentation over a home theatre system, or downgraded for presentation over a compact mobile device. This may not only affect the size of the rendered image or audio resolution, but also the compactness of the encoded media to a point where actual recoding into a different compression scheme might be necessary, because the original codec is not supported in the mobile device. A package modification may replace content, modify content, transcode content, or be added to the package. Since package modifications can be generated by any of a variety of sources at various times during the life span of a dynamic media package, a service may aggregate, review, and distribute the modifications for efficient maintenance of the package modifications.

Figure 9:
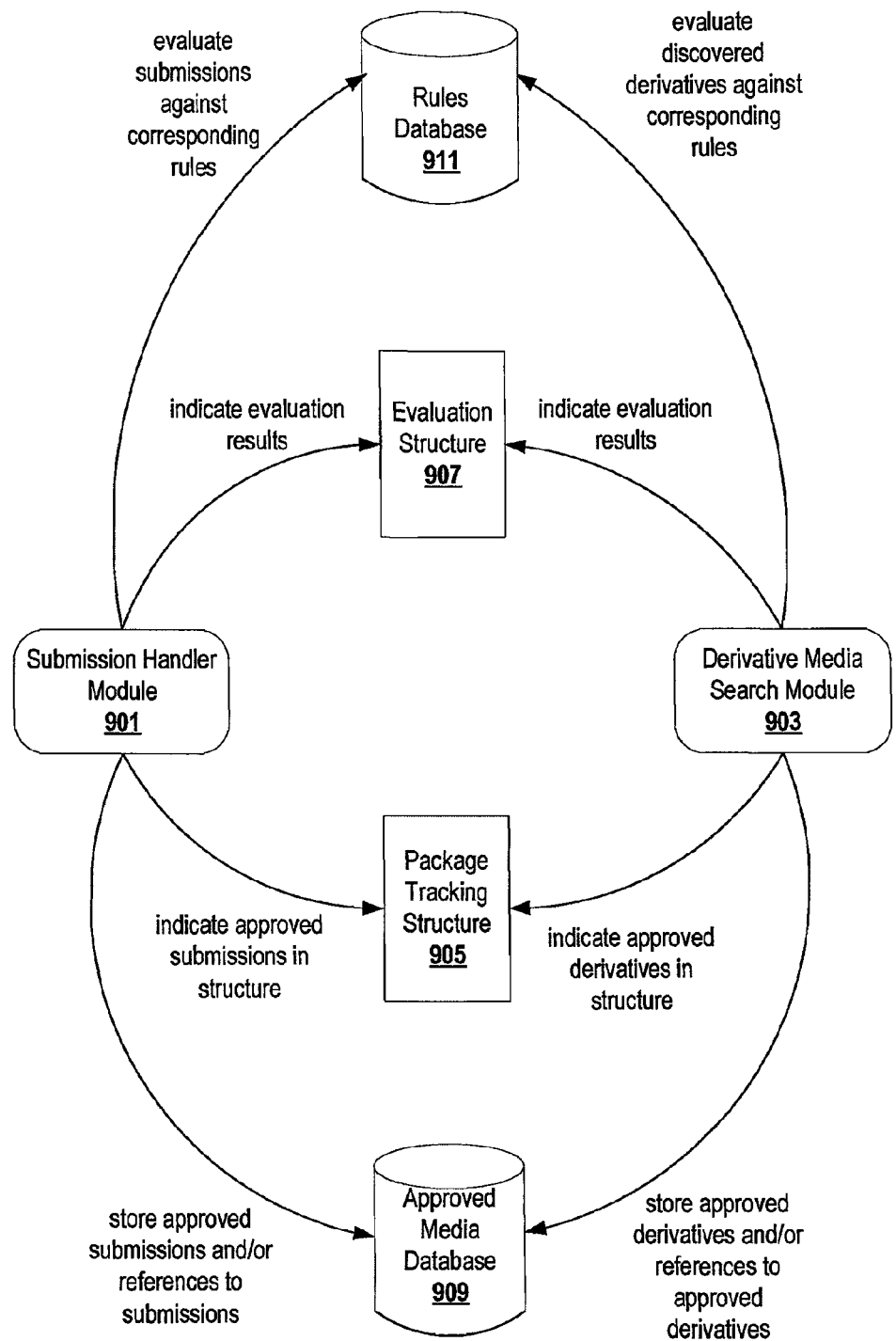
FIG. 9 depicts an example system that maintains package modifications.

FIG. 9 depicts an example system that maintains package modifications. A rules database 911 hosts rules that govern packages that are associated with particular seed media. For example, a rule may require automatic acceptance of any submission from the corresponding media owner/creator. Another rule may reject any encoding submission that modifies the protective measures of a package unless created by a particular author. The rule database 911 is accessed by a submission handler module 901 and a derivative media search module 903. The modules 901 and 903 are implemented in one or more machines, and may or may not be implemented at a same physical entity or location. When the submission handler module 901 receives a submission, the submission handler module 901 evaluates the submission against corresponding rules in the rules database 911. The corresponding rules may be determined by examining a submission for identifying data, such as a hash value(s), watermark, and/or fingerprint data. The submission handler module 901 indicates a result from evaluation of the submission against the appropriate rule(s) in an evaluation structure 907. Maintaining indications of evaluation results allows for expedient dispensation of previously evaluated submissions. If the submission handler module 901 approves a submission, then the submission is indicated in a package tracking structure 905 that tracks approved submissions. If approved, the submission and/or a reference to the submission are stored in an approved media database 909. It is not necessary to discard rejected submissions, however. A rejected submission may be stored in the same or a separate database for various reasons, such as archiving, comparison purposes, gathering of statistical data etc.

In addition to being submitted, package modifications may be discovered on the Internet. The derivative search module 903 searches a network (e.g., the Internet, a LAN, a particular online community, etc.) for consumer generated media derived from seed media. For example, the search module 903 may search using fingerprint data, hash values, etc., of seed media. The search module 903 evaluates discovered derivative media against appropriate rules in the rules database 911. Similar to the submission handler module 901, the search module 903 updates the structures 907 and 905 and the database 909 in accordance with evaluations. Whether rejected or approved, an indication of an evaluation result for a particular discovered derivative media is recorded in the evaluation structure 907. If approved, the approval is indicated in the package tracking structure and the discovered derivative media and/or a reference thereto is stored in the approved media database 909. Indication of approval of a submission may also be accompanied by tracking information, such as a package version or date of approval, when distributing the approved submission.

Figure 6:
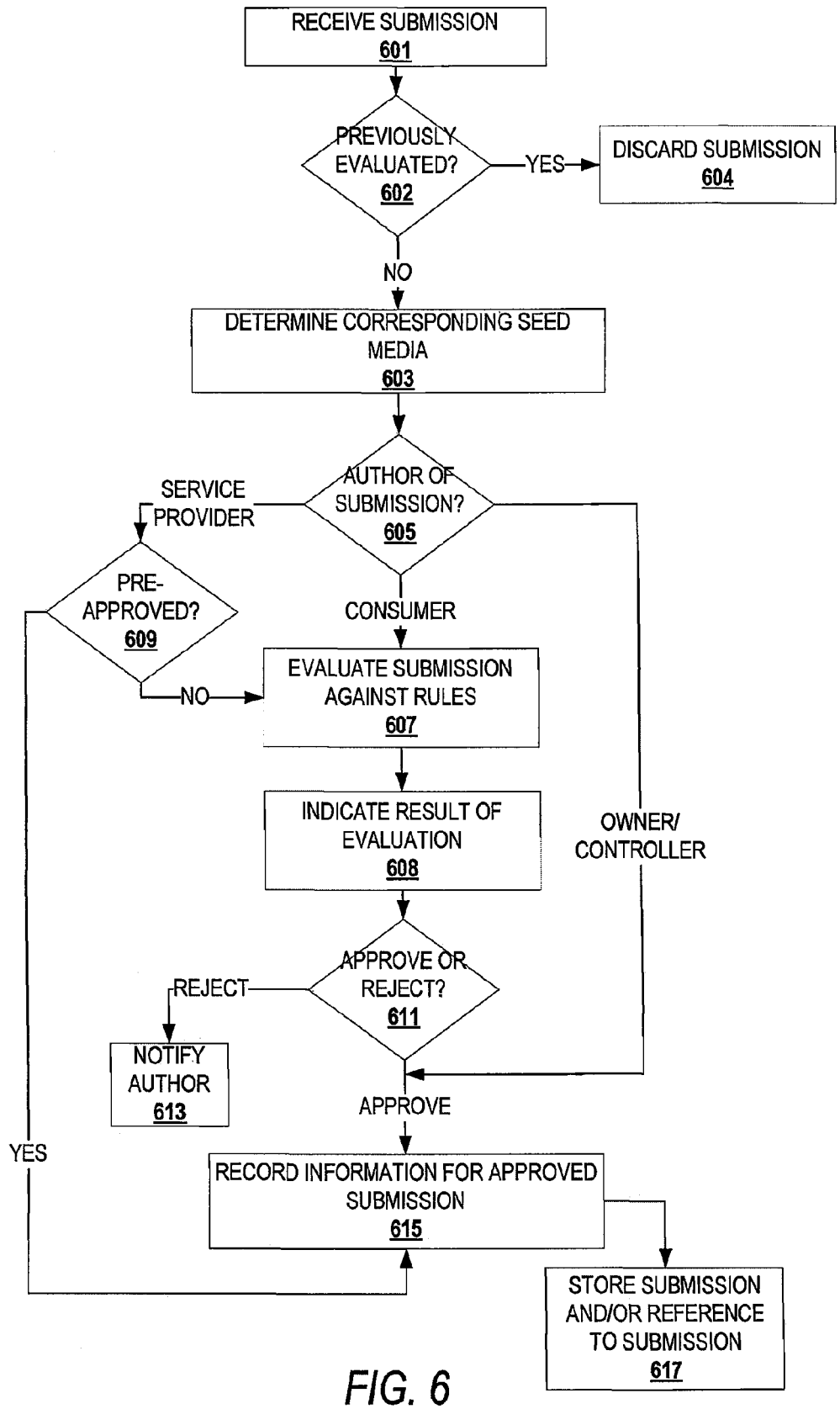
FIG. 6 depicts a flowchart of example operations for handling submissions.

FIG. 6 depicts a flowchart of example operations for handling submissions. At block 601, a submission is received. At block 603, it is determined whether the received submission has previously been evaluated. If so, then the submission is discarded at block 604. Otherwise, the corresponding seed media is determined at block 603. At block 605, the author of the submission is determined. If the author is a service provider, then control flows to block 609. If the author is a consumer, then control flows to block 607. If the author is an owner/creator of the seed media, then control flows to block 615.

At block 609, it is determined whether the service provider is pre-approved. For instance, the service provider has an agreement in place with the seed media creator/owner to provide submissions. If the service provider is pre-approved, then control flows to block 615. Otherwise, control flows to block 607.

At block 607, the submission is evaluated against the rules for the corresponding seed media. At block 608, the result of the evaluation is indicated. At block 611, it is determined whether the submission is rejected or approved. If rejected, then the author is notified of the rejection at block 613. If approved, then information is recorded for the approved submission at block 615. For example, information about authorship, rights ownership, creation date, approval date, size, media type, attribution, etc., is recorded. At block 617, the submission and/or a reference to the submission is stored. An author or representative of the author/rights owner may also be notified of approved submissions. A notification of an approved submission may also invite the author/rights owner to participate in a royalty scheme that compensates the author/rights owner based on popularity and percentage contribution.

Figure 7:
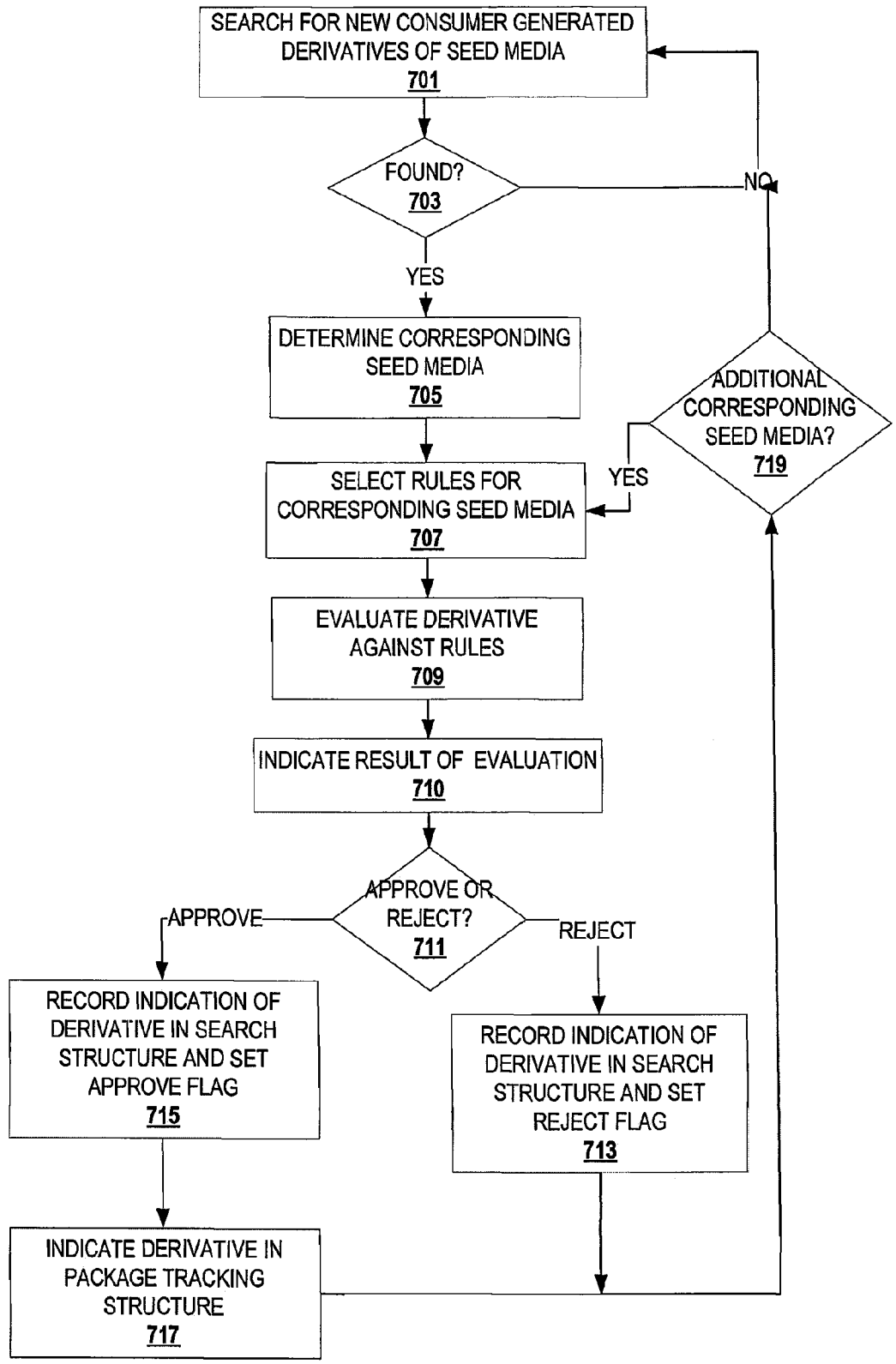
FIG. 7 depicts a flowchart for example operations to search for derivative media.

FIG. 7 depicts a flowchart for example operations to search for derivative media. At block 701, search for new consumer generated derivative media commences. The search for new derivative media may include, for example, crawling media oriented websites (e.g. YouTube) and analyzing descriptions, metadata, audio/speech identification or fingerprinting that may be associated with discovered derivative media. Other websites and networks may be crawled as well in search for relevant derivative and related media (i.e. images, news stories, blog entries, podcasts, discussions, etc.) At block 703 it is determined if derivative media has been found. If not, then control returns to block 701. If new derivative media has been found, then the corresponding seed media is determined at block 705. For example, the derivative media is examined for any watermarking, or a fingerprint of the derivative media is generated and compared against a fingerprint database. In another example, the derivative media indicates attribution information in a header segment. At block 707, rules for the corresponding seed media are selected. At block 709, the discovered media is evaluated against the selected rules. At block 710, a result of the evaluation is indicated. At block 711, it is determined whether the discovered derivative media is approved or rejected. If approved, control flows to block 715. If rejected, control flows to block 713.

At block 715, an indication of the discovered media is recorded in a search structure with an approve flag set and indication of the corresponding seed media. For example, a structure is employed to track results of the search to avoid redundant evaluations. Additional information may also be recorded in the search structure to avoid certain network addresses, allow for evaluation of media against new or modified rules, etc. At block 717, the discovered derivative media is indicated in a package tracking structure. Control flows from block 717 to block 719.

At block 713, indication of the discovered derivative media is recorded in the search structure and a rejected flag is set along with indication of the corresponding seed media. The seed media is also indicated in case a submission is allowed for a first seed media, while rejected for a second seed media. Control flows to block 719 from block 713.

At block 719, it is determined whether other seed media correspond to the discovered derivative media. If so, then control flows to block 707. If there are no other corresponding seed media, then control returns to block 701.

Figure 13:
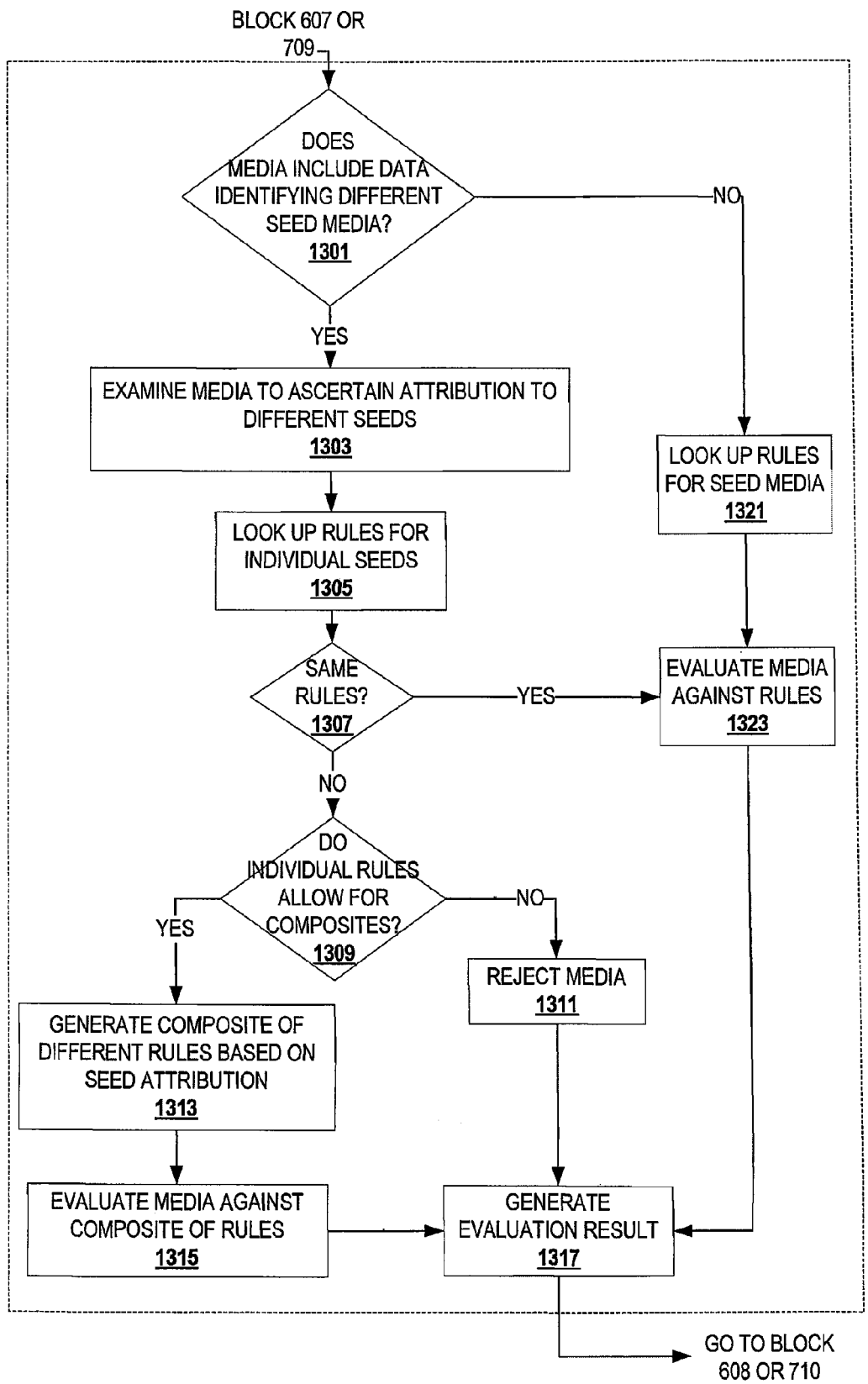
FIG. 13 depicts a flowchart for example application of a composite set of rules to media that may be performed in block 607 of FIG. 6 or block 709 of FIG. 7.

As stated above, multiple seed media may correspond to a submission. To conform to various rules for different seed media, a composite of different rules may be applied to media. FIG. 13 depicts a flowchart for example application of a composite set of rules to media that may be performed in block 607 of FIG. 6 or block 709 of FIG. 7. At block 1301, it is determined whether the submitted or discovered media (or accompanying information, such as in a header) includes data identifying different seed media. If the media (or accompanying information) does not include data identifying different seed media, then control flows to block 1321. If the media includes data that identifies different seed media, then control flows to block 1303.

At block 1303, the media is examined to determine attribution to different seeds. At block 1305, the rules for the individual seeds are looked up. At block 1307, it is verified whether the rules are the same. If the rules are the same, then control flows to block 1323. If the rules are not the same, then control flows to block 1309.

At block 1309, it is determined whether the individual rules allow for composite rules. If composite rules are not allowed, then control flows to block 1311. If composite rules are allowed then control flows to block 1313.

At block 1311, the media is rejected. Control flows from block 1311 to block 1317.

At block 1313, a composite of the different rules are generated based on seed attribution. Other factors may also be considered in the generation of composite rules, such as priority, pre-configured conflict resolution policy, etc. At block 1315, the media is evaluated against the composite rules. At block 1317, a result of the evaluation is generated. Control flows to either block 608 or 710 from block 1317.

At block 1321, rules for the seed media are looked up. At block 1323, the media is evaluated against the rules. If the rules were determined to be the same at block 1307, then a rule or one of the sets of rules is selected. Control flows from block 1323 to block 1317.

Using various business models and delivery protocols, approved modifications are made available to media consumers with dynamic mixed media packages. Delivery of dynamic mixed media packages can be implemented in various manners. The entity that maintains package modifications may push all approved package modifications. The entity may prompt media consumers to accept or reject installation of approved package modifications. A query event may be detected at a consumer machine or device that triggers querying of an entity for any package modifications.

Figure 5:
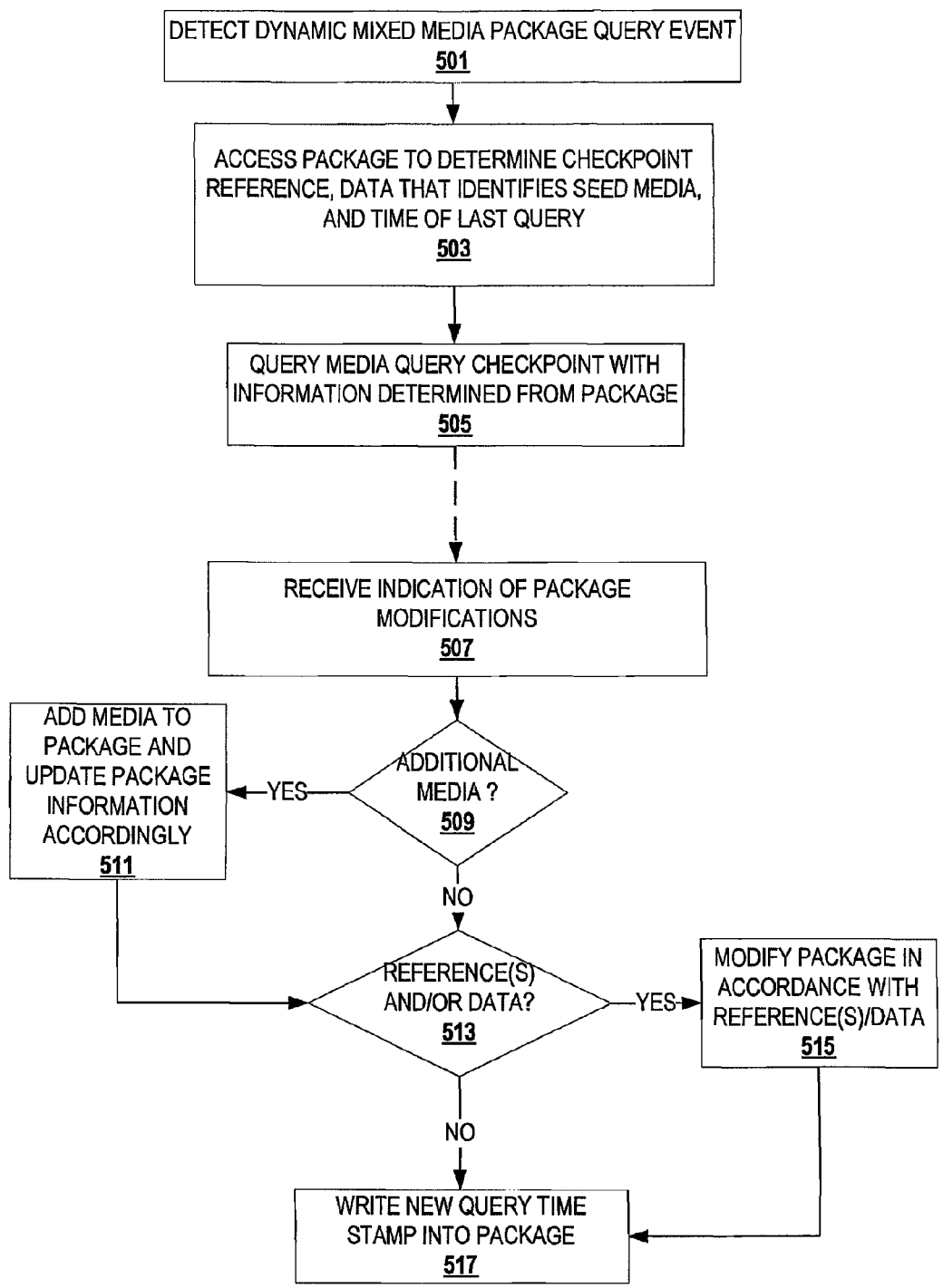
FIG. 5 depicts a flowchart of example operations for querying an entity for a package modification responsive to a query event.

FIG. 5 depicts a flowchart of example operations for querying an entity for a package modification responsive to a query event. At block 501, a dynamic mixed media package event is detected for a dynamic mixed media package. At block 503, the dynamic mixed media package is accessed to determine a reference for a package query checkpoint, data that identifies the seed media of the package, and optionally a time of last query. For example, a hash value for the seed media, URL of a media packager, timestamp, and a unique index such as a customer or session identifier are written into a request message. Additional information may also be written into the query that affects the query result, such as consumer service level, community membership, etc. At block 505, the package query checkpoint is queried with the information determined at block 503. A dashed line from block 505 to block 507 represents a lapse of time until a response is received to the query.

Profile information may be kept for each consumer to assist in determining media package modifications or updates. The profile information for a consumer may be generated by collecting various characteristics related to the consumer. Media use, applied rankings, device type and location, duration of use, time of use, and other information may be gathered on a consumer device and sent to a central server for analysis. According to other example embodiments, the gathered information may be analyzed at least partially on the consumer device before sending data to a central server.

The type of profile applied to a consumer may vary based on location, time of day, or device in use. For example, a consumer's viewing/listening habits may suggest that certain types and genres of media are preferred when on an airplane versus in a car, versus at the office. Based on this information, differing media package modifications or updates may be suggested or performed depending on the consumer's location. Location information may be gathered or estimated based on device information (e.g., laptop, portable media player, vehicle based media player, desktop computer, set top box, etc. . . . ), or by physical locating technology (GPS, cellular triangulation, etc. . . . ).

Time of day information may also be used to gather consumer media use information and suggest media package updates. On the morning drive into work, a customer may prefer a particular genre of music or talk radio, and on the drive home another type of music may be preferred. This profile information may be determined based on listening habits of the consumer, and appropriate suggested updates may be made to the media package to coincide with that profile.

Similarly, certain types and genres of media may be experienced to while in a car (rock music for example), while other media is generally experienced on the set top box in the living room (TV shows and movies for example), and yet other media is experienced on the portable media player (short videos and classical music for example). Because of these differing media viewing habits across varying devices (e.g., with different rendering capabilities), profiling specific to the device being used may provide the user with a tailored experience. The device information may also affect media package modifications or updates based on device specific preferences for media file types and sizes that are more compatible with the particular device being used.

The profiling information may feed a suggestion engine which not only takes into account user habits and tendencies with respect to media, but also uses temporal, spatial, and other environmental information to enhance the user experience. Policies or rules may be used in conjunction with the profiling information to provide a customized experience taking into account environmental factors and consumer requirements. Age-based rules, public setting rules, cultural rules, and other similar rules may be set into a policy to help control content delivery dependent on various factors. Media content may have a maturity rating (e.g. PG-13, R, X, explicit, non-explicit . . . ), and delivery of that media may be restricted based on the age of the viewer (e.g. a viewer under the age of 13 may not be allowed to view certain content). The location of the viewer (e.g. on a public train) may also affect the acceptable maturity level. Additionally, policies may be put in place based on content which may be deemed culturally acceptable or unacceptable in certain areas of the world.

Figure 8:
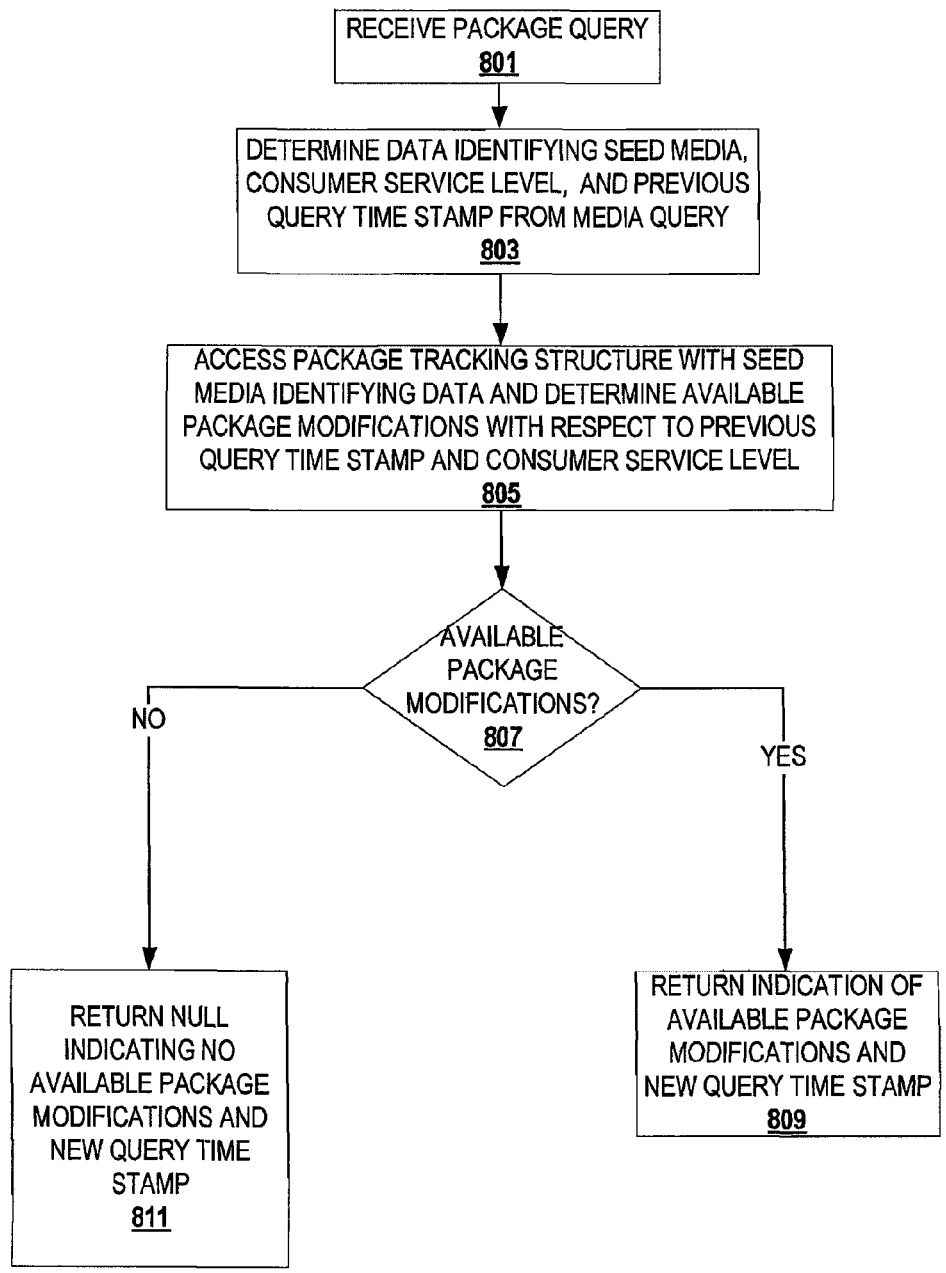
FIG. 8 depicts a flowchart for example operations for handling a package query for a dynamic mixed media package.

FIG. 8 depicts a flowchart for example operations for handling a package query for a dynamic mixed media package. At block 801, a package query is received. At block 803, data identifying a seed media and a previous query timestamp are determined from the query. At block 805, a package tracking structure is accessed with the data determined at block 803 to determine package modifications available since the previous query timestamp. The available package modifications may also be filtered based on consumer service level, privilege, geography, etc. At block 807, it is determined whether any package modifications are available. If package modifications are available, then an indication of the available package modifications is returned to the media consumer with a new query timestamp or other identifier at block 809. For example, a message is returned that includes some new media to be added to the package, and references to other media. If there are no available package modifications, then a null value is returned with a new query timestamp.

Referring again to FIG. 5, an indication of package modifications is received at block 507. At block 509, it is determined if additional media is to be added to the package. If so, control flows to block 511. If there is no additional media, then control flows to block 513.

At block 511, the additional media is added to the package and the package information is updated accordingly. At block 513, it is determined whether the indication of package modifications included a reference(s) and/or data. For example, it is determined whether the response to the query indicated network addresses, a new encoding scheme, ratings data, etc. If so, then control flows to block 515. Otherwise, control flows to block 517.

At block 515, the package is modified in accordance with the reference(s) and/or data. For example, the ratings data is written into the clear content section of the package, a reference is written into a header for the consumer generated media section of the package, etc. At block 517, the new query timestamp is written into the package.

Figure 10:
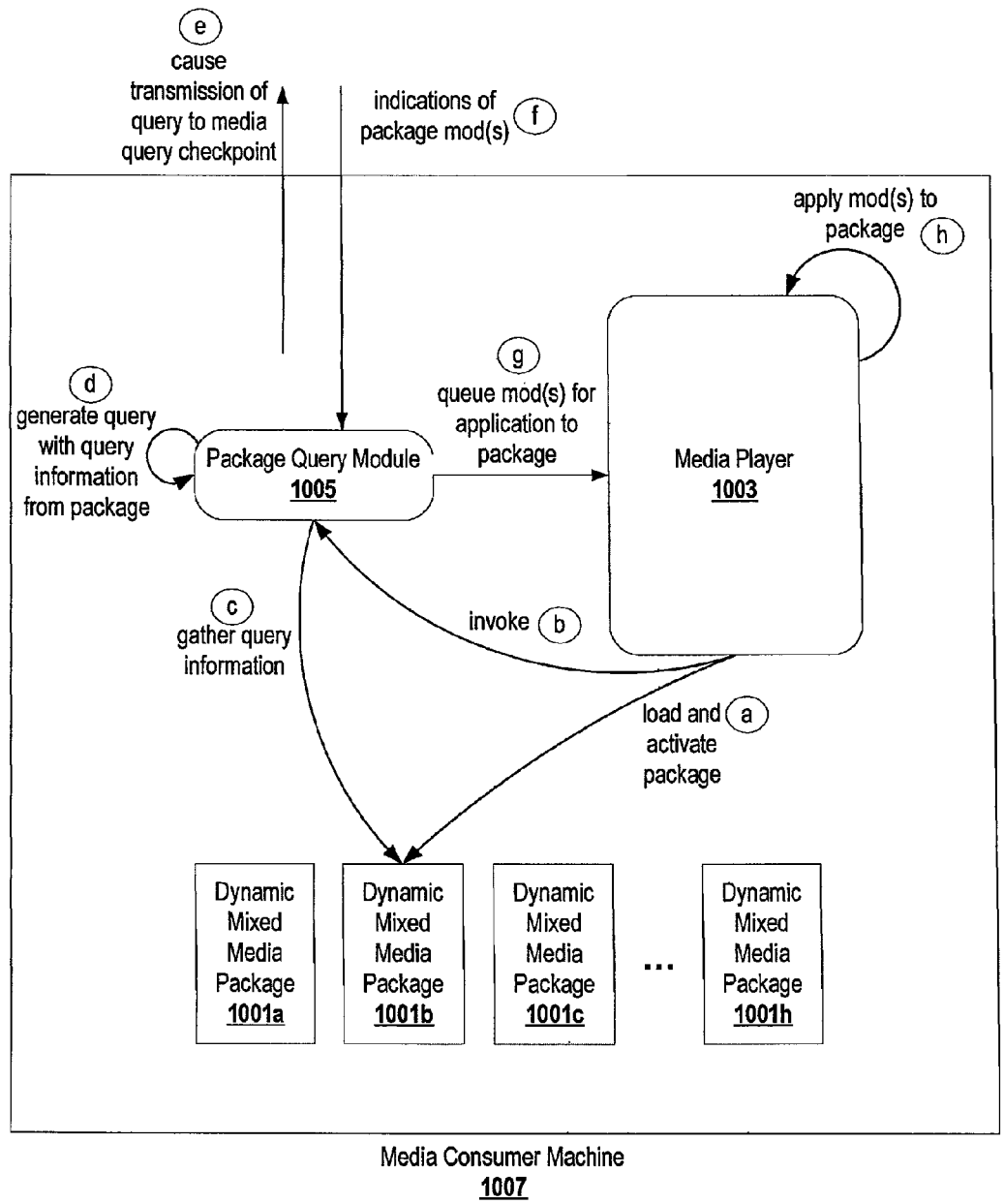
FIG. 10 depicts an example implementation of a media query module.

A variety of implementations are possible for querying a checkpoint for modifications. For instance, functionality that detects an event and generates a query may be implemented as a component of a media player, a background process, daemon, plug-in, etc. FIG. 10 depicts an example implementation of a media query module. In FIG. 10, a media player 1003 is separate from a package query module 1005 in a media consumer machine 1007, which may be a mobile device, consumer electronic device, computer, one or more components in an automobile, etc. The media query module 1005 may be a plug-in to the media player 1003, process that runs in the background, etc. The media consumer machine 1007 hosts dynamic mixed media packages 1001*a*-1001*h*. The media player 1003 loads and activates the dynamic mixed media package 1001*b* at a time a. At a time b, the media player 1003 invokes the package query module 1005 or notifies the package query module 1005 of the activation of the dynamic media package 1001*b*. In various embodiments a query event is detected differently (e.g., the package query module 1005 monitors the address space occupied by the dynamic mixed media packages 1001*a*-1001*h*, an interprocess communication mechanism notifies the package query module 1005 when a dynamic mixed media package is accessed, etc.). At a time c, the package query module 1005 gathers query information from the dynamic mixed media package 1001*b*. In another embodiment, a registration structure maintains query information for the packages hosted on the media consumer machine 1007, and the package query module accesses the structure based on a package identifier communicated by the media player 1003. At a time d, the package query module generates a query with the gathered information. At a time d, the package query module causes the generated query to be transmitted to the checkpoint indicated for seed media of the dynamic mixed media package 1001*b*. At a time f, an indication of a package modification(s) is received and handled by the package query module 1005. The package query module 1005 queues the modification(s) for application to the package 1001*b* at time g. At a time h, the media player 1003 applies the queued modification(s) to the package 1001*b*. It should be appreciated by those of ordinary skill in the art that the illustration of FIG. 10 is intended to aid in understanding as one example implementation and not meant to be limiting. For instance, the modification to the package may be applied by the package query module 1005 when the media player 1003 completes a current presentation. In another example, the package query module 1005 modifies the package 1001*b* while the media player presents media from a copy of the package 1001*b* to be discarded after presentation.

Figure 16:
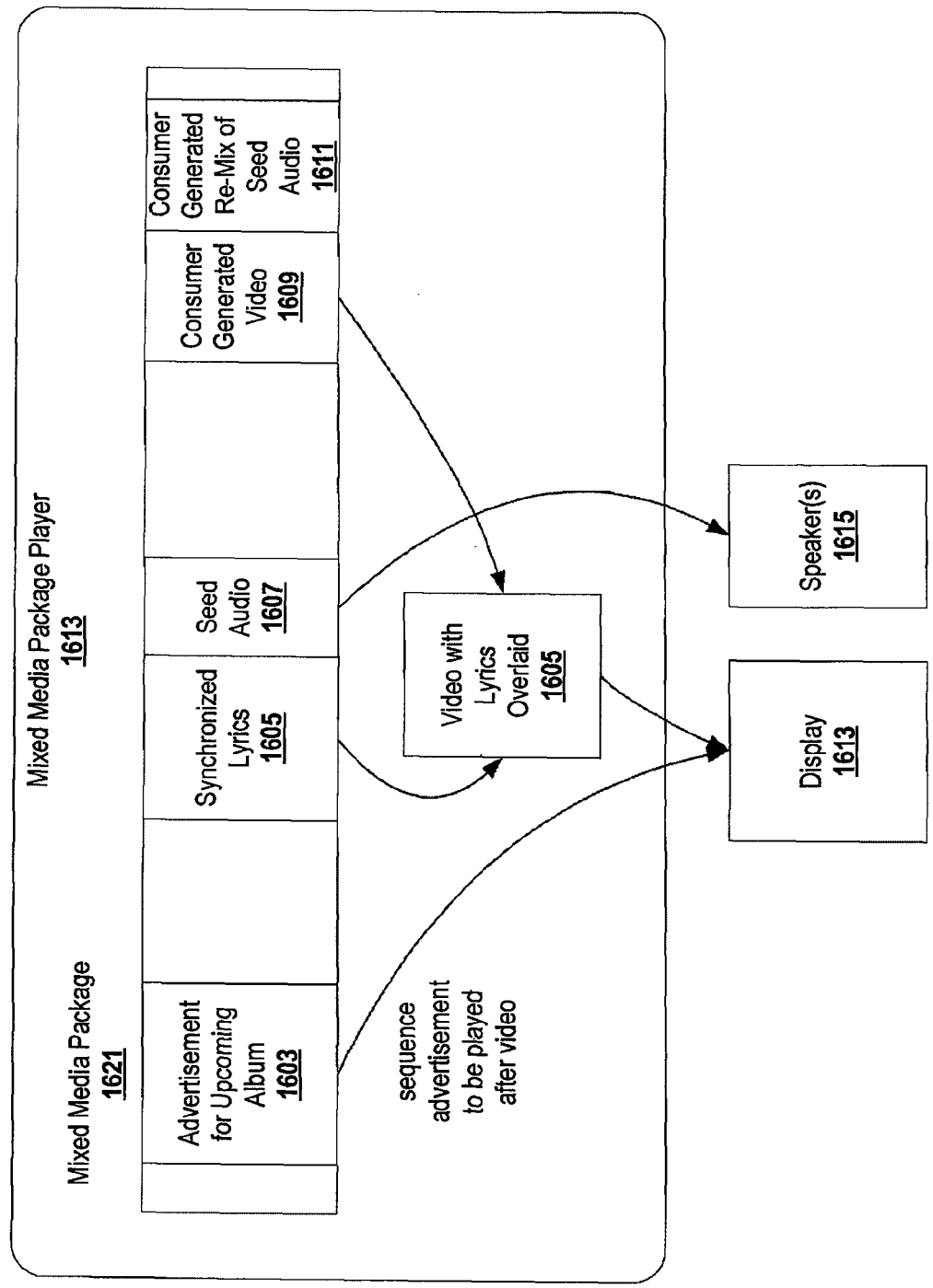
FIG. 16 depicts an example presentation of media from an example dynamic mixed media package.

A media player presents media of a dynamic mixed media package as directed by corresponding presentation directives. Directives may direct a player to overlap media, stream media concurrently, enforce a sequence upon media, etc. Some presentation directives may be pre-defined in the package, while others are commands from a user. FIG. 16 depicts an example presentation of media from an example dynamic mixed media package. A mixed media package player 1613 loads and activates a dynamic mixed media package 1621. The mixed media package 1621 includes an advertisement 1603 for an upcoming musical album, synchronized lyrics 1605, seed audio 1607, a consumer generated video, and a consumer generated re-mix 1611 that includes the seed audio 1607. Assume a consumer commands the player 1613 to play the consumer generated video 1609 with lyrics 1605. A presentation directive(s) in the header for the consumer media section directs the player 1613 to play the seed audio 1607 with the consumer generated video 1609. The current play directive causes the player 1613 to overlay the lyrics 1605 onto the video 1609 to create the video 1605 with overlaid lyrics. A directive for the package 1613 directs the player to sequence the advertisement 1603 for presentation after completion of the video 1605. The player 1613 concurrently sends the seed audio 1607 to speaker(s) 1615 and the video 1605 to the display 1613. The directive also directs the player to send the advertisement 1603 to the display 1613 after the video 1605 has completed.

Figure 11:
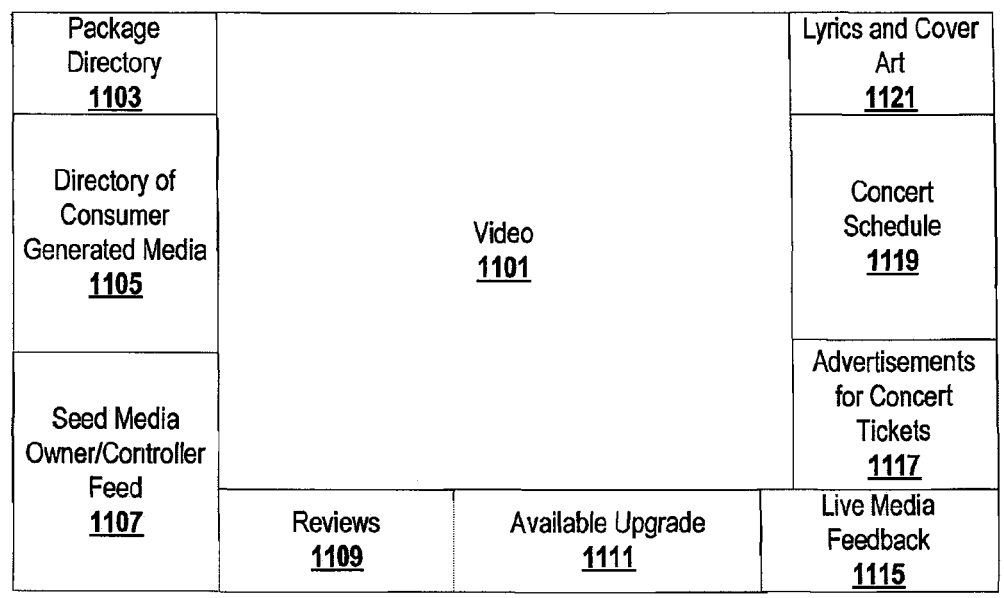
FIG. 11 depicts an example interface for a dynamic mixed media package player.

A player may utilize an interface that accommodates video play and a few controls, or a more complicated interface that divides a display area among various content of a dynamic mixed media package. FIG. 11 depicts an example interface for a dynamic mixed media package player. In FIG. 11, a display area of an interface has been divided into 10 regions. A video region 1101 presents video from a mixed media package. A package directory 1103 presents accessible content of a package to user (e.g., in tree hierarchy format, icon format, etc.). A directory of consumer generated media region 1105 presents a directory of consumer generated media that has been added to the package. A seed media owner/creator feed region 1107 streams information from a recording company, publisher, and/or artist. A lyrics and cover art region 1121 presents cover art and lyrics for the seed audio in a double truck layout that can be expanded to allow a consumer to navigate similar to flipping through pages of an album jacket. A concert schedule region 1119 presents a concert schedule for the author of the seed audio of the package, perhaps, as filtered by current geographic information of the machine or device hosting the player. A region 1117 presents advertisements for concerts in the area by musicians of the same genre of music. A region 1109 presents music reviews by consumers and critics, depending on the level of service purchased. A region 1111 presents upgrades available for the seed audio, such as richer sound, improved player, etc. A region 1115 presents live media feedback. For example, live comments from consumers in a music community are displayed in the region 1115.

FIG. 11 illustrates just one example of many possible examples. Numerous features and permutations of interfaces are possible with a dynamic mixed media package. For example, when audio from an album is played, a digital representation of an album booklet can be displayed in a double truck layout. Photos can be on one side, with lyrics and credits on the other side. The pages of the booklet can be flipped on a device with a large display area or scrolled through on a device with a constrained display area. Lyrics can be synchronized with audio on the level of individual words, playback of audio may be triggered by clicking on the lyrics, etc.

For image media, various functionality is also possible. A slideshow can be generated with all images of a particular artist or label. Consumer photos can be mixed in with musical artist photos and set to the audio of the artist.

In addition to the functionality allowed by dynamic mixed media packages, additional products and services can be spawned. A dynamic mixed media package can define themes for devices. For example, the sounds and display may be configured to comport with a theme as defined for a dynamic mixed media package for a particular album. For instance, the first few notes of the 4 most popular songs of the album may be utilized for 4 different ring/alarm sounds of a phone and the wallpaper for the phone set to cover art for the album. Design tools can be developed to mix media in a dynamic mixed media package. Moreover, new services can be offered that maintain package modifications, review submissions, track statistics, compensate consumers that generate popular media, RSS feeds, blogs, news services, user ratings, etc.

A web-based application (e.g., "widget"), may be used with the dynamic mixed media package to advertise and share derivative media, share listening/viewing preferences, help maintain package modifications, and provide other media package related services. The widget may be coded into a personal web page, blog, social networking site, or other places in which a consumer may wish to share media related information. According to one example embodiment, the widget may connect with the media player 1003 (see FIG. 10), and may display an album cover or other image related to music currently being played by the user. Other information may additionally be made available through the widget, including playlist information, partial or complete music or video playback ability, links to purchase the song or album or related media package, or other information. Similar information may be provided through the widget with respect to a video or other form of media being experienced by the consumer.

According to another embodiment, the widget may include derivative media created by the consumer. The user may use the widget to share and advertise derivative media. Visitors viewing the widget may be able to view the derivative media. In some cases, visitors may be prompted to purchase a media package or at least some additional content related to the derivative media. For example, if the derivative media is a reenactment/replacement scene from a movie, the visitors may be prompted to first purchase or rent a copy of the movie in order to view the replacement scene in line with the rest of the movie. According to some embodiments, multiple pieces of additional content (which may be seed media) may be necessary to fully experience the derivative media. In the aforementioned example, the base movie is needed and perhaps replacement soundtrack music may be needed. A viewer may be prompted to first purchase these items before viewing the derivative media.

The described embodiments may be provided as a computing machine program product, or software, that may include a machine-readable medium having stored thereon instructions, which may be used to program a processing system (or other electronic devices) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer, a personal data assistant, a cellular phone, a media center, game console, etc.). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 12:
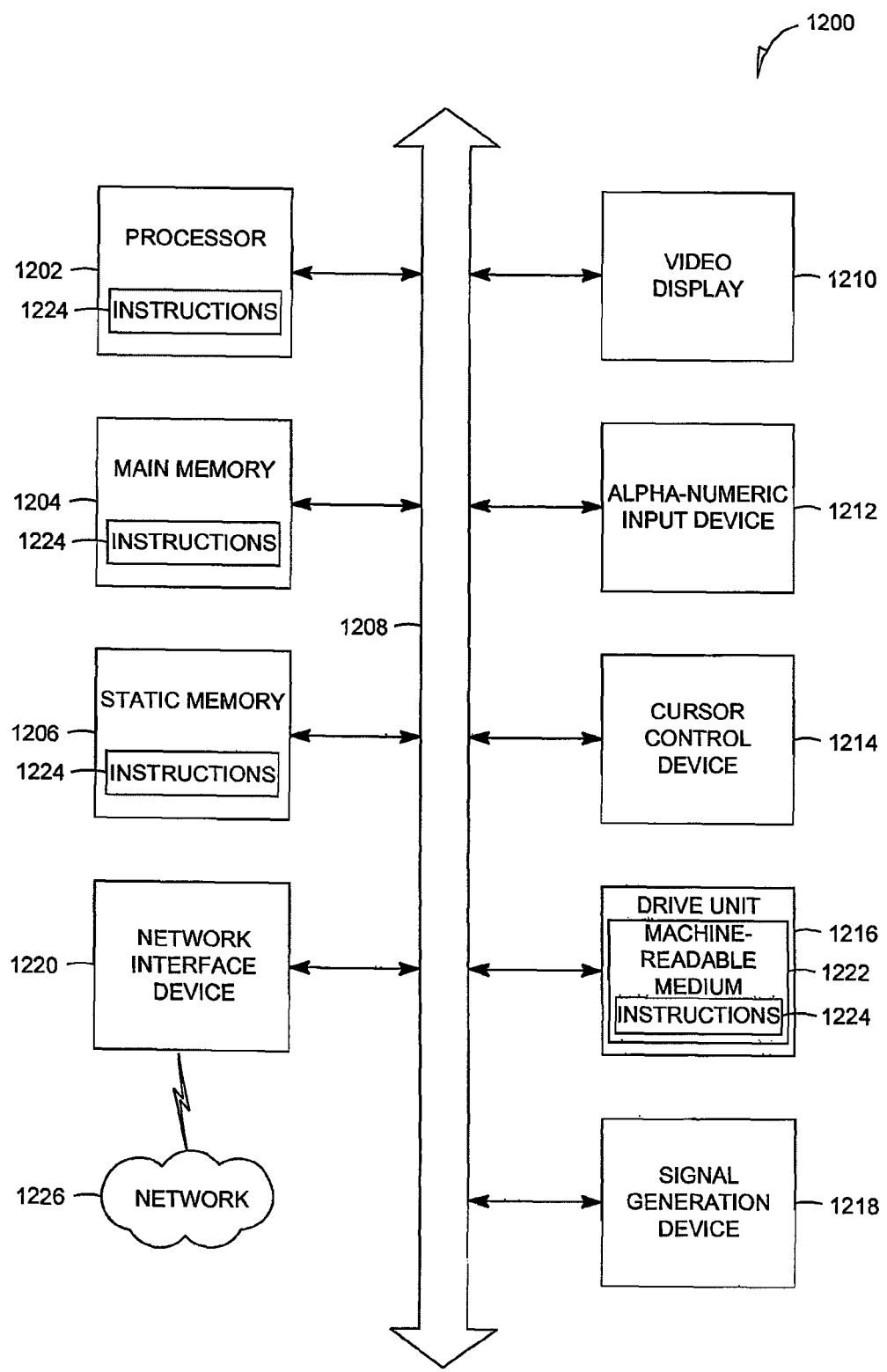
FIG. 12 depicts a diagrammatic representation of a machine in the example form of a processing system 1200 within which a set of instructions, for causing the machine to perform any of the functionality discussed herein, may be executed.

FIG. 12 depicts a diagrammatic representation of a machine in the example form of a processing system 1200 within which a set of instructions, for causing the machine to perform any of the functionality discussed herein, may be executed. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 1200 includes a processor 1202 (e.g., a central processing unit (CPU) a graphics processing unit (GPU) or both), a main memory 1204 and a static memory 1206, which communicate with each other via a bus 1208. The processing system 1200 may further include a video display unit 1210 (e.g., a liquid crystal display (LCD) or a cathode ray tube (CRT)). The processing system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the processing system 1200, the main memory 1204 and the processor 1202 also constituting machine-readable media.

The software 1224 may further be transmitted or received over a network 1026 via the network interface device 1220.

While the invention(s) is (are) described with reference to various implementations and exploitations, it will be understood that these embodiments are illustrative and that the scope of the invention(s) is not limited to them. In general, techniques for access-based security evaluation of files introduced from a source external to a machine may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method, comprising:
   in a device communicably connected to a plurality of media consumer devices via a communication network:
   generating identifying information of seed media from the seed media;
   assembling a media package that contains:
     a seed media segment comprising the seed media and supplemental media pertinent to the seed media,
     a seed media segment information section comprising the identifying information of the seed media, and
     a package header comprising presentation directives that govern presentation of the seed media and the supplemental media by a media consumer device;
   embedding, into the package header of the media package, a reference to a first device to be accessed via the communication network to query for modifications to the media package or download the modifications;
   providing the media package to a media consumer after assembly of the media package via the communication network;
   receiving a submission generated by the media consumer device, that corresponds to the media consumer, via the communication network;
   evaluating the received submission for approval, wherein the received submission is evaluated based on a rule corresponding to the seed media; and
   storing an indication of the approved submission in a data structure that corresponds to the media package.

2. The method of claim 1, wherein the generating of the identifying information further includes:
   generating the identifying information based on at least a portion of the seed media, the identifying information including at least one of a watermark, a fingerprint, or a hash value.

3. The method of claim 1, further comprising:
   supplying an instance of the media package; and
   indicating the approved submission in response to a received query for approved submissions to the instance of the media package.

4. The method of claim 1, wherein
   the seed media is generated by a second device that corresponds to a media creator; and
   the supplemental media further includes derivative media generated based on the seed media and based on further media.

5. The method of claim 4, further comprising:
   identifying a portion of the derivative media as attributed to the media creator, wherein:
   the identifying of the portion includes processing at least one of a watermark, a fingerprint, or a hash value corresponding to the portion identified as attributed to the media creator.

6. The method of claim 4, further comprising:
   identifying a portion of the derivative media as attributed to the media creator; and
   computing a royalty due to the media creator based on the portion of the derivative media attributed to the media creator.

7. The method of claim 4, wherein
   the further media is generated by a third device that corresponds to the media consumer of the seed media; and
   the method further comprises:
     identifying a portion of the derivative media as attributed to the media creator; and
     identifying a further portion of the derivative media as attributed to the media consumer, and
     the identifying of the further portion includes processing at least one of a watermark, a fingerprint, or a hash value corresponding to the further portion attributed to the media consumer.

8. The method of claim 4, wherein
   the further media is generated by a third device that corresponds to the media consumer of the seed media,
   the method further comprises:
     identifying a portion of the derivative media as attributed to the media creator;
     identifying a further portion of the derivative media as attributed to the media consumer; and
     computing a royalty due to the media consumer based on the further portion of the derivative media identified as attributed to the media consumer.

9. The method of claim 1, wherein the supplemental media further includes at least one of a preview of further media, a trailer of the further media, a review of the seed media, artwork that corresponds to the seed media, or lyrics that correspond to the seed media.

10. The method of claim 1, wherein the supplemental media is generated by the media consumer device that corresponds to the media consumer of the seed media, the supplemental media further including at least one of a music video, a comment, an edited video, an altered soundtrack that corresponds to video data, or a remix of audio data.

11. The method of claim 1, wherein:
the reference has a uniform resource locator (URL) usable to address a request to the device; and
the method further comprises indicating approved submission in response to a request received using the URL.

12. The method of claim 1, wherein the seed media further includes at least one of a video file, an audio file, or an image file.

13. The method of claim 1, wherein the approved submission includes at least one of:
a modification to the seed media;
a modification to the supplemental media;
a reference to further media that corresponds to the seed media; or
an advertisement.

14. The method of claim 1, wherein the submission includes derivative media generated by the media consumer device based on the seed media and based on further media, and the derivative media is at least one of a replacement of the seed media or overlaying media that corresponds to the seed media.

15. The method of claim 1, wherein the submission includes:
derivative media generated by the media consumer device based on the seed media and based on further media, and
an authorization to distribute a portion of the derivative media, wherein the authorization is granted by the media consumer.

16. The method of claim 1, wherein the submission includes:
derivative media generated by the media consumer device based on the seed media and based on further media, and
an advertisement generated by the media consumer device that corresponds to the media consumer.

17. The method of claim 1, wherein the method further comprises:
selecting the approved submission based on a rating generated by the media consumer device that corresponds to the media consumer; and
providing the selected submission to another media consumer device.

18. The method of claim 1, wherein the method further comprises:
determining a profile of the media consumer, wherein the determination of the profile is based on a rating generated by the media consumer device that corresponds to the media consumer.

19. The method of claim 1, wherein the method further comprises:
providing further media to the media consumer device that corresponds to the media consumer, wherein the further media is provided based on a profile of the media consumer determined based on a rating generated by the media consumer device.

20. The method of claim 1, wherein the data structure that corresponds to the media package is accessible by another media consumer device and usable by the another media consumer device to determine that one or more approved submissions for the media package are available.

21. The method of claim 1, wherein the submission includes a rating generated by the media consumer device that corresponds to the media consumer, wherein the rating is an evaluation of at least a portion of the media package, and the rating includes at least one of:
a score within a rating scale;
an approval indicator;
a disapproval indicator;
an affirmative indicator;
a negative indicator; or
a written review.

* * * * *